United States Patent [19]
Coulonvaux

[11] Patent Number: 6,139,607
[45] Date of Patent: Oct. 31, 2000

[54] AIR CLEANER ASSEMBLY; AND METHOD

[75] Inventor: Paul R. Coulonvaux, Brussels, Belgium

[73] Assignee: Donaldson Company, Inc., Minneapolis, Minn.

[21] Appl. No.: 09/440,583

[22] Filed: Nov. 15, 1999

Related U.S. Application Data

[63] Continuation of application No. 09/146,291, Sep. 3, 1998, Pat. No. 6,039,778, which is a continuation-in-part of application No. 08/928,684, Sep. 12, 1997, Pat. No. 6,051,042.

[51] Int. Cl.[7] .................................................. B01D 46/24
[52] U.S. Cl. ........................... 95/273; 55/502; 55/503; 55/504; 55/498
[58] Field of Search .............................. 55/498, 502, 503, 55/504; 95/273

[56] References Cited

U.S. PATENT DOCUMENTS

| | | |
|---|---|---|
| 1,423,412 | 7/1922 | Garner . |
| 2,675,886 | 4/1954 | McMullen . |
| 3,130,025 | 4/1964 | Bowden et al. . |
| 3,218,785 | 11/1965 | Tietz . |
| 3,357,163 | 12/1967 | Burger et al. . |
| 3,423,909 | 1/1969 | Bennett et al. . |
| 3,584,439 | 6/1971 | Gronholz . |
| 3,616,618 | 11/1971 | Gronholz et al. . |
| 3,672,130 | 6/1972 | Sullivan et al. . |
| 4,006,000 | 2/1977 | Tortorici et al. . |
| 4,017,100 | 4/1977 | Gehrig et al. . |
| 4,130,405 | 12/1978 | Akado et al. . |
| 4,135,899 | 1/1979 | Gauer . |
| 4,148,732 | 4/1979 | Burrow et al. . |
| 4,211,543 | 7/1980 | Tokar et al. . |
| 4,217,121 | 8/1980 | Fichter . |
| 4,261,710 | 4/1981 | Sullivan . |
| 4,278,455 | 7/1981 | Nardi . |
| 4,312,651 | 1/1982 | Esaki et al. . |
| 4,333,580 | 6/1982 | Sweigart, Jr. . |
| 4,491,460 | 1/1985 | Tokar . |
| 4,493,717 | 1/1985 | Berger, Jr. et al. . |
| 4,501,376 | 2/1985 | Bushby . |
| 4,632,682 | 12/1986 | Erdmannsdörfer . |
| 4,637,919 | 1/1987 | Ryder et al. . |
| 4,950,317 | 8/1990 | Dottermans . |
| 5,120,337 | 6/1992 | Benzler et al. . |
| 5,171,342 | 12/1992 | Trefz . |
| 5,391,212 | 2/1995 | Ernst et al. . |
| 5,545,241 | 8/1996 | Vanderauwera et al. . |
| 5,547,480 | 8/1996 | Coulonvaux . |
| 5,605,654 | 2/1997 | Hsich et al. . |
| 5,649,986 | 7/1997 | Mueller . |
| 5,676,273 | 10/1997 | Jonkers et al. . |
| 5,688,299 | 11/1997 | Goodwin . |
| 5,706,777 | 1/1998 | Schlessmann et al. . |
| 5,730,769 | 3/1998 | Dungs et al. . |
| 5,755,842 | 5/1998 | Patel et al. . |
| 5,800,581 | 9/1998 | Gielink et al. . |

FOREIGN PATENT DOCUMENTS

| | | |
|---|---|---|
| 0 562 502 A1 | 9/1993 | European Pat. Off. . |
| 0 634 203 A3 | 1/1995 | European Pat. Off. . |
| 0 329 659 B1 | 4/1995 | European Pat. Off. . |
| 25 20 099 | 11/1976 | Germany . |
| 26 30 875 | 1/1978 | Germany . |
| 26 41 679 | 3/1978 | Germany . |
| 33 36 882 A1 | 5/1985 | Germany . |
| 43 32 559 A1 | 3/1995 | Germany . |
| 93/9129 | 8/1994 | South Africa . |
| 1 563 649 | 3/1980 | United Kingdom . |
| 2 035 832 A | 6/1980 | United Kingdom . |
| 94/13389 | 6/1994 | WIPO . |

OTHER PUBLICATIONS

Declaration of Stan Koehler with Exhibit A, 7 pages.

*Primary Examiner*—Duane S. Smith
*Attorney, Agent, or Firm*—Merchant & Gould P.C.

[57] ABSTRACT

An air cleaner assembly having a body member and a removable cover is provided. The assembly includes a lock assembly for engagement between the cover and the body member. The preferred lock assembly is a rotation activated lock assembly movable between locked and unlocked orientations by a selected amount of relative rotational movement between the cover and the body member.

21 Claims, 25 Drawing Sheets

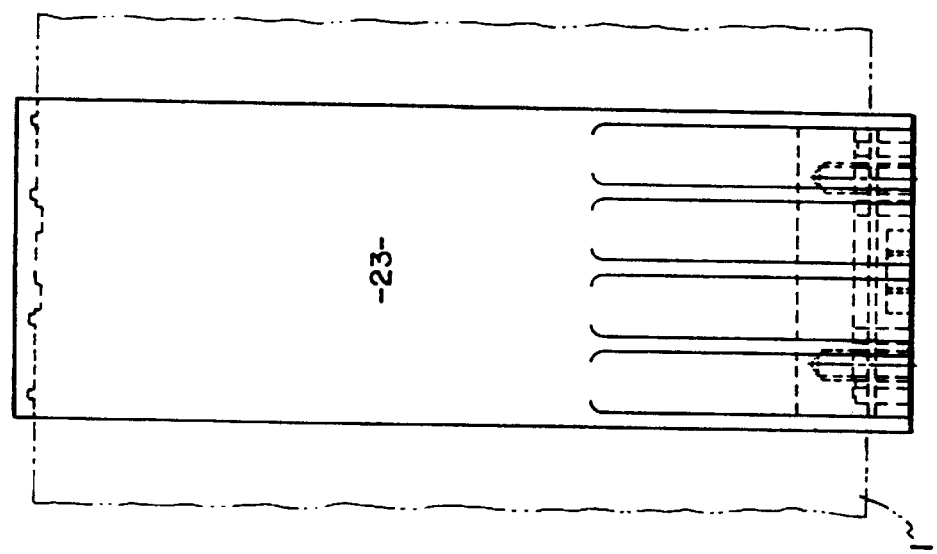
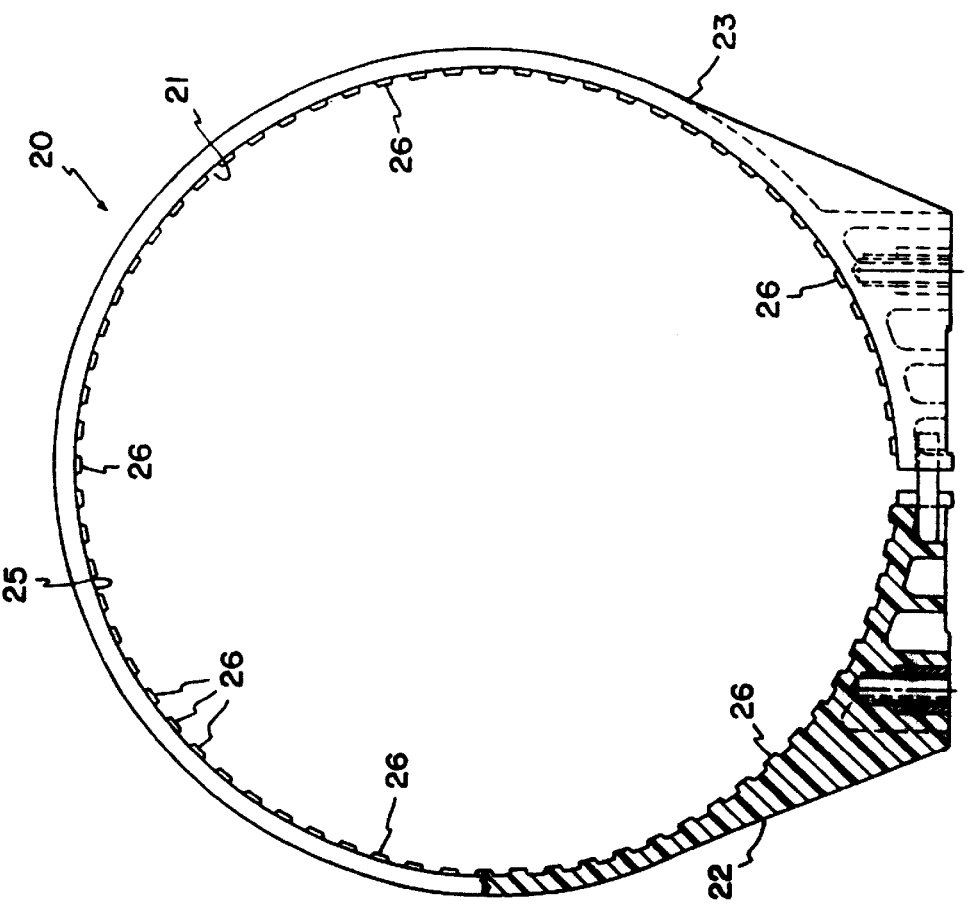

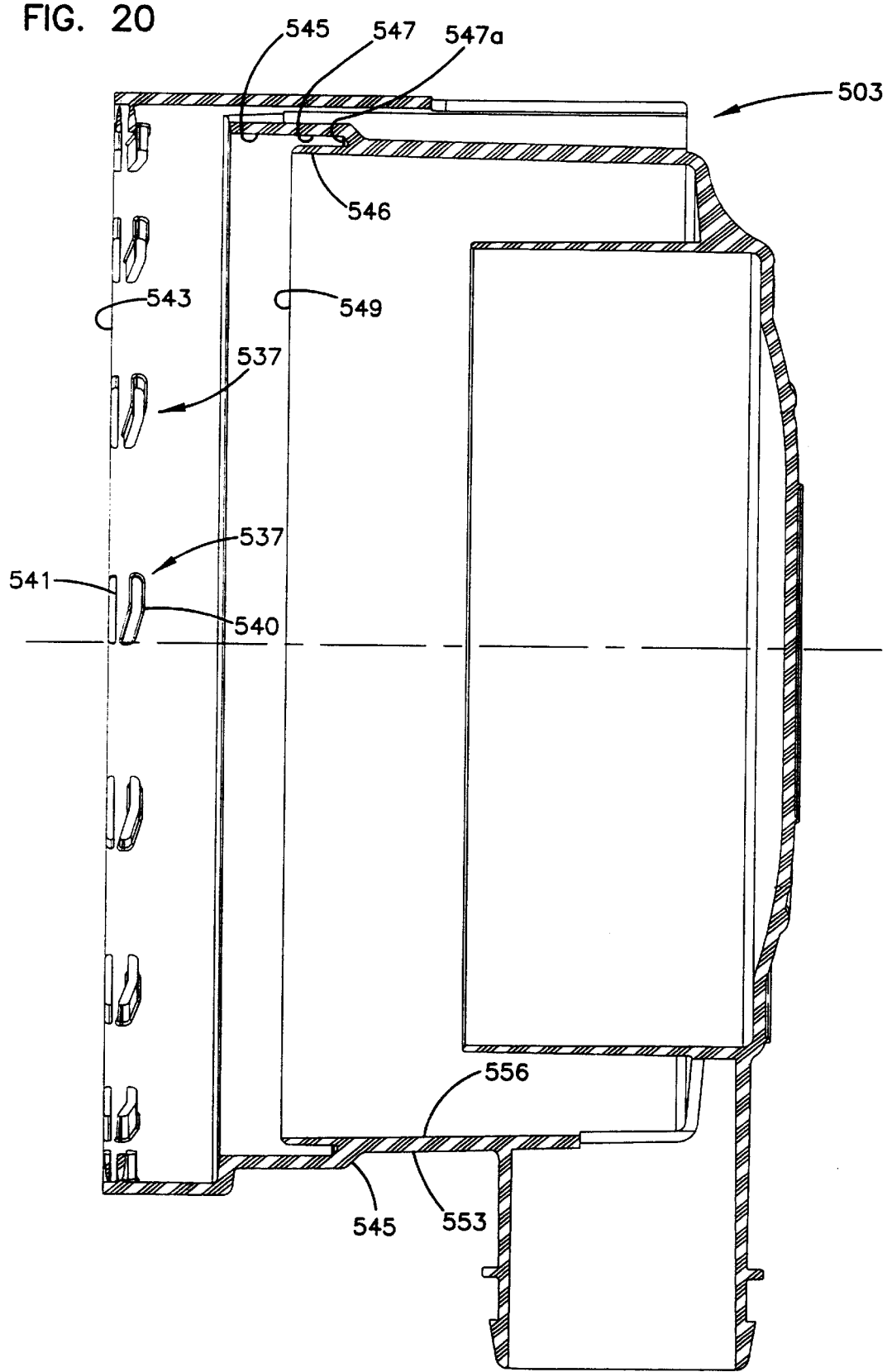

AIR CLEANER ASSEMBLY; AND METHOD

This application is a continuation of application Ser. No. 09/146,291, filed Sep. 3, 1998 now U.S. Pat. No. 6,039,778. application Ser. No. 09/146,291 is a Continuation-in-Part of application Ser. No. 08/928,684 filed Sept. 12, 1997 now U.S. Pat. No. 6,051,042. The complete disclosures of application Ser. Nos. 09/146,291 and 08/928,684 are incorporated herein by reference.

FIELD OF THE INVENTION

The present application relates to air cleaners. It particularly concerns air cleaners having a housing comprising two sections which, together, enclose an air filter element. The invention concerns a preferred arrangement for securing two housing sections to one another. The invention also concerns methods of assembly and use.

BACKGROUND OF THE INVENTION

Air cleaner assemblies are widely utilized in connection with intake air flow, for example to internal combustion engines. Air cleaners are used on such equipment as: heavy duty trucks; construction equipment, (for example, graders, bulldozers, and backhoes); agricultural equipment (for example, tractors and combines); off-road vehicles; buses; light duty trucks; automobiles; special equipment (for example, forklifts and loaders); and other types of equipment (for example, lawn tractors). The engines for such systems generally use an air cleaner, which may vary in size and capacity, depending on the system. For systems generally utilizing an 8-inch air cleaner, the engines are typically about 5 liters and have a horse power of typically about 100 hp.

A purpose of the air cleaner, in such systems, is generally to filter incoming air to the engine, in order to protect engine parts from damage. In general, the air cleaners comprise housings having removable and replaceable filter elements positioned therein. The filter elements in many systems have generally circular or cylindrical configurations and are operated in a "forward flow" manner; i.e., with filtering flow from an exterior of the element to an interior. For equipment of the type described above, often the air flow rates through the air cleaners are the order of about 30 to 350 CFM (cubic feet per minute) (about 0.8–10 cubic meters per minute), depending on whether the engines are idling or under load. To accommodate the desired filter lifetime, filter efficiency needs and space limitations, generally filter element diameters on the order of 3.0 to 8.5 inches (about 75–210 mm) are commonly used with such equipment. Such filter elements generally weigh from 200 grams to 1200 grams new (clean), and can gain in weight by up to 3 times or more during use. Air cleaner housings having diameters of at least 4 to 10 inches (about 100–1000 mm), and lengths of 7.5 to 24 inches (about 100–600 mm), for such equipment, are relatively common. It is for use with such air cleaners as the ones described in this and the previous paragraph that arrangements according to the present invention were particularly developed. That is, the invention is particularly suitable for such systems, although it may be applied to others.

Air cleaners of the type described in the previous two paragraphs are regularly and routinely serviced. In some instances, air filter elements are removed and are either cleaned or replaced. Also, in some instances the interior chamber of the air cleaner is cleaned of materials such as leaves, settled dust, etc. To facilitate installation and servicing, air cleaner arrangements are constructed so that they can be opened and elements can be installed and removed.

Typically, to facilitate assembly and service, air cleaner housings are constructed in two major portions: a main body member section; and, a cover. Generally, the cover is nonthreadably mounted on the body section, to enclose the air cleaner body. A variety of arrangements have been used to secure the cover to the housing, in air cleaners of the type characterized above, including, for example: bolt systems; metal latches; and plastic latch arrangements.

SUMMARY OF THE DISCLOSURE of U.S. Ser. No. 08/928,684

According to the disclosure of U.S. Ser. No. 08/928,684, an air cleaner assembly is provided. The air cleaner assembly generally includes a body member and a removable cover. The assembly includes a lock assembly for selectively securing the removable cover to the body member. The preferred lock assembly is rotation activated. That is, the cover is secured in engagement with the body member, and is released from engagement, based upon selected rotational movement of the cover, relative to the body member. For a preferred arrangement of U.S. Ser. No. 08/928,684, the lock assembly is constructed so that movement between locked and unlocked orientations occurs with relatively little rotational movement, on the order of only about 5° to 25°.

Preferred lock assemblies according to U.S. Ser. No. 08/928,684 are positioned such that no portion of them is directly "exposed" to the exterior environment when the system is engaged, i.e., when the cover is locked onto the body member. By this, it is meant that when the cover is locked onto the body member, the portions which comprise the lock assembly are positioned underneath the cover, and are not directly exposed to the exterior environment or elements. Thus, the housing preferably includes no apertures therein oriented over the lock assembly. This means, inter alia, that snow, ice, road tar, mud, etc. will be less likely to interfere with the smooth operation of the locking assembly. Herein, when the term "internal lock assembly" is used, it is meant that the lock assembly is positioned or contained under a protective outer surface or outer surfaces of the housing, having no apertures therein, when the lock assembly is assembled and locked. The term "internal" when used in this context refers to protection under any portion of the cover and/or body member, as long as direct external exposure, through an aperture or otherwise, is not involved.

For typical applications, the body member defines an open air cleaner interior and includes an air flow inlet. Typically, the air flow inlet will be a side inlet, although alternatives are usable. The body member generally includes a sidewall and an endwall. The sidewall is sized to receive at least a portion of a removable and replaceable air filter element therein, during use. The insertion of the air filter element, into the body member, is through an open end defined by the sidewall.

Typical air cleaner arrangements according to U.S. Ser. No. 08/928,684 include an air flow outlet through which filtered air flows from the air cleaner in its path to downstream equipment such as a vehicle engine. The air flow outlet may comprise a piece snap fit to a remainder of the body member; or, it may be constructed integral with the body member.

In a preferred arrangement as described and shown in U.S. Ser. No. 08/928,684, the rotation activated lock assembly comprises a lug-and-socket or foot-and-holder lock arrangement, including a socket or foot arrangement and a lug or holder arrangement. The socket or foot arrangement is mounted on a first one of the body member and cover; and, the lug or holder arrangement is mounted on a second one of the body member and cover. The socket or foot arrangement and the lug or holder arrangement are arranged such that, during locking, portions of the socket or foot arrangement are secured in place by portions of the lug or holder arrangement. A preferred arrangement of U.S. Ser. No. 08/928,684 is such that, upon rotation to the unlocked orientation, disengagement between those portions of the socket or foot arrangement and the lug or holder arrangement occurs.

In preferred assemblies according to U.S. Ser. No. 08/928, 684, the socket or foot arrangement comprises a plurality of L-shaped feet or foot members (i.e. sockets) positioned on the cover; and, the lug or holder arrangement comprises a plurality. of holders (or lugs) positioned on the body member. According to U.S. Ser. No. 08/928,684 preferably the L-shaped foot members (sockets) are evenly, radially, spaced; and, the holders (lugs) are also evenly radially spaced.

Certain preferred configurations for the holders (lugs) and L-shaped feet (sockets), to accommodate convenient locking, convenient unlocking, and convenient manufacture were identified in U.S. Ser. No. 08/928,684. To facilitate locking, the configuration of the holders (lugs) is selected such that each holder (lug) has a pair of spaced projections thereon defining a recessed, concave or slot portion which receives, in frictional engagement, a locking projection, bead or detent, during locking.

In certain embodiments of U.S. Ser. No. 08/928,684, the holders (lugs) rest and are trapped, over-center, in recesses in the feet (sockets). As such, the locking assembly in preferred embodiments operates as an "over-center" lock. By "over-center lock", it is meant a lock where the maximum torsion or bearing force occurs during relative passage over the center between the holders (lugs) and the feet (sockets), but is relieved on opposite sides of the center, i.e., in a locked, or unlocked, orientation.

According to the disclosure of U.S. Ser. No. 08/928,684, a method of securing a cover onto an air cleaner embodiment is provided. The method preferably involves orienting the cover in covering relation to an end of the body member; and, rotating the cover to the locked orientation. Preferably, the locked orientation is obtained by use of a preferred rotational oriented locking assembly as described; and, is a non-threaded arrangement.

According to U.S. Ser. No. 08/928,684 in certain embodiments, an engagement finger assembly or construction is provided. The engagement finger construction includes a member slideable into a position that inhibits unlocking of the locking assembly, when selectively positioned.

SUMMARY OF THE PRESENT DISCLOSURE

An air cleaner assembly is provided. The air cleaner assembly includes a body member and a removable cover. A rotation activated lock assembly is provided having a first unlocked orientation and a second locked orientation. The cover is separable from the body member when the lock assembly is in the first, unlocked orientation. The cover is secured to the body member when the lock assembly is in the locked orientation. The rotation activated lock assembly is constructed and arranged to selectively move between the unlocked orientation and the locked orientation by rotational movement of the cover relative to the body member. The rotation activated lock assembly includes a holder arrangement and feet. Preferably, the holder arrangement includes a plurality of holders. Each of the feet has a segment oriented to engage a selected one of the holders during locking.

Preferably, in certain embodiments, each of the holders is p-shaped, each having a tail extending generally perpendicular to a direction of rotation of the cover relative to the body member during locking. In preferred arrangements, each of the feet includes a banana-shaped segment oriented to engage a selected one of the p-shaped holders during locking. Each tail of each p-shaped holder extends sufficiently far to block rotation of the cover, relative to the body member, by engagement with a portion of a selected foot beyond a selected amount of rotation, during locking.

In other aspects, an air cleaner assembly is provided having a body member, a removable cover, and a rotation activated lock assembly. The rotation activated lock assembly includes a holder arrangement and a plurality of feet. The holder arrangement comprises a plurality of holders, each holder preferably comprising an outer perimeter wall arrangement defining a central hollow. Preferably, each of the feet includes a segment oriented to engage a selected one of the holders during locking.

In certain preferred embodiments, a moveable engagement finger is provided to be selectively positionable between engaged and release positions. When in the engaged position, the engagement finger is preferably positioned to secure a selected holder between a portion of the engagement finger and a selected foot member to prevent rotational movement of the cover relative to the body member. When in the release position, the engagement finger is preferably releasing a selected holder to allow selected rotational movement of the cover relative to the body member.

In other aspects, a method of securing a cover member to a body member is provided. The method includes a step of covering an open end of a body member with a cover and rotating the cover relative to the body member. Preferably, a step of depressing an engagement finger into an engagement position, to block unintended reverse rotation of the cover relative to the body member, is conducted.

BRIEF DESCRIPTION OF THE DRAWINGS

FIG. 15 is a front side elevational, partially cross-sectional, view of a mounting bracket usable with an air cleaner housing according to U.S. Ser. No. 08/928,684;

FIG. 16 is a side elevational, partially fragmented, somewhat schematic, view of the mounting bracket of FIG. 15 engaging an air cleaning housing of U.S. Ser. No. 08/928,684;

FIG. 20 is a cross-sectional view of the arrangement depicted in FIG. 19; FIG. 20 being generally taken along line 20—20, FIG. 19A;

DETAILED DESCRIPTION

I. THE DISCLOSURE OF U.S. Ser. No. 08/928,624

Figure 1:
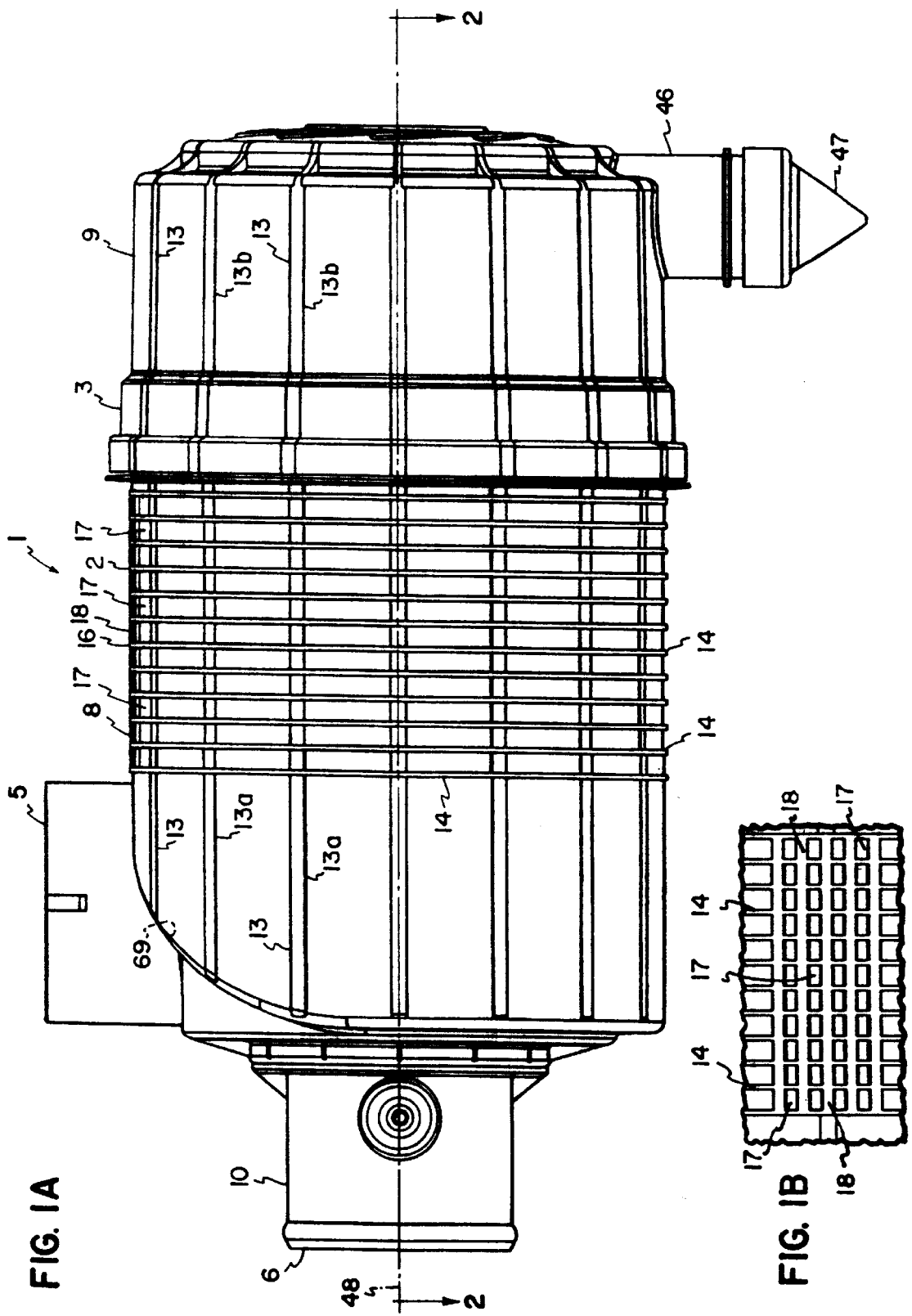
FIG. 1A is a front side elevational view of a first embodiment of a housing for an air cleaner, according to the disclosure of U.S. Ser. No. 08/928,684.
FIG. 1B is a fragmented, enlarged, top plan view of a portion of the housing of FIG. 1A used to receive a mounting bracket.

The principles of the U.S. Ser. No. 08/928,684, now U.S. Pat. Des. No. 412,567 can be incorporated into air cleaners of a variety of sizes and configurations. In the accompanying figures, the principles are shown embodied in plastic arrangements having distinctive topical features. These distinctive topical features are the subjects of U.S. design patent disclosures filed on the same date as U.S. Ser. No. 08/928,684; i.e. Sep. 12, 1997, now U.S. Pat. Des. No. 412,567; 412,568; 407,475; and 401,306. Selected references to these distinctive features will also be made herein.

General Description

The reference numeral 1, FIG. 1A, indicates an air cleaner assembly according to U.S. Ser. No. 08/928,684 now U.S. Pat. No. 6,051,042. The air cleaner assembly 1, in FIG. 1A, is depicted in front side elevational view. The assembly 1 includes an exterior housing 2 defining an exterior 3 and interior 4 (FIG. 2). Air to be filtered enters the housing 2 through an inlet 5. Within the housing 2, the air is filtered. The air then passes outwardly through an outlet 6. The air is then directed to downstream equipment, for example, an engine.

Still referring to FIG. 1A, the housing 2 of the particular air cleaner assembly 1 depicted primarily comprises molded plastic components. In particular, the housing 2 comprises a molded plastic body member 8 and a molded plastic cover 9. Further, the outlet 6 comprises molded plastic outlet tube 10. As will be understood by further descriptions below, the outlet tube 10, for the particular arrangement shown, is snap fit into a portion of body member 8.

Certain principles of the disclosure of U.S. Ser. No. 08/928,684 now U.S. Pat. No. 6,051,042, described hereinbelow in detail, concern the manner in which the cover 9 is secured to the body member 8. Before details concerning this are described, further overview discussion is presented.

Still referring to FIG. 1A, the exterior 3 of housing 2 includes: (a) certain distinctive topical features; and also, (b) other features primarily for facilitating function or operation. For example, housing 2 includes exterior ribs 13 thereon. The ribs 13 are axially aligned and extend across both the body member 8 and the cover 9. Ribs 13 primarily serve to provide a distinctive appearance. Note that the body member 8 and cover 9 are molded such that portions of ribs 13a and 13b thereon, respectively, align to provide ribs 13 of a continuous and distinctive appearance, when the cover 9 is properly positioned in locking and covering relation to body member 8, as shown in FIG. 1A.

Still referring to FIG. 1A, exterior surface 3 of the housing 2, in a portion which comprises body member 8, is provided with spaced radial ribs or rings 14. Although the number and spacing of the rings 14 is not critical, these rings 14 serve in part to strengthen the plastic body member 8 in regions where a mounting bracket, discussed below, for securing the air cleaner assembly 1 to equipment such as a truck, will be positioned.

Referring to FIG. 1B, in portion 16 of body member 8, housing 2 includes a plurality of traps or indents 17. The traps or indents 17 are generally rectangular (in top plan view) and are defined by rings 14 and side extensions 18. The indents 17 are positioned to selectively receive portions of a mounting bracket, as described below, during mounting of the air cleaner assembly 1. As a result of interlock between portions of the mounting bracket and the traps or indents 17, air cleaner assembly 1 can be easily secured in a selected rotational position relative to equipment on which it is mounted. That is, engagement between the indents 17 and the mounting bracket prevent rotation of the air cleaner assembly 1 relative to the mounting bracket and/or the equipment.

Attention is now directed to FIGS. 15 and 16. In FIGS. 15 and 16, a mounting bracket 20 (having open interior 21) usable with air cleaner assembly 1 as depicted in FIG. 1A, is shown. The mounting bracket 20 has an arched configuration with legs 22 and 23 defining open interior 21. In use, the legs 22 and 23 are spread open and air cleaner assembly 1 is positioned to extend through interior 21. The mounting bracket 20 includes an interior surface 25 having detents 26 thereon. A desired rotational orientation between the air cleaner assembly 1 and the mounting bracket would be selected. Detents 26 would then be positioned to engage selected ones of traps or indents 17 in the air cleaner assembly, to achieve the desired rotational configuration. The mounting bracket 20 is readily secured to a vehicle, for example, through bolts or other suitable fastening arrangements.

A mounting bracket analogous to the one described herein is described in detail in U.S. Pat. No. 5,545,241, the complete disclosure of which is incorporated herein by reference.

Figure 3:
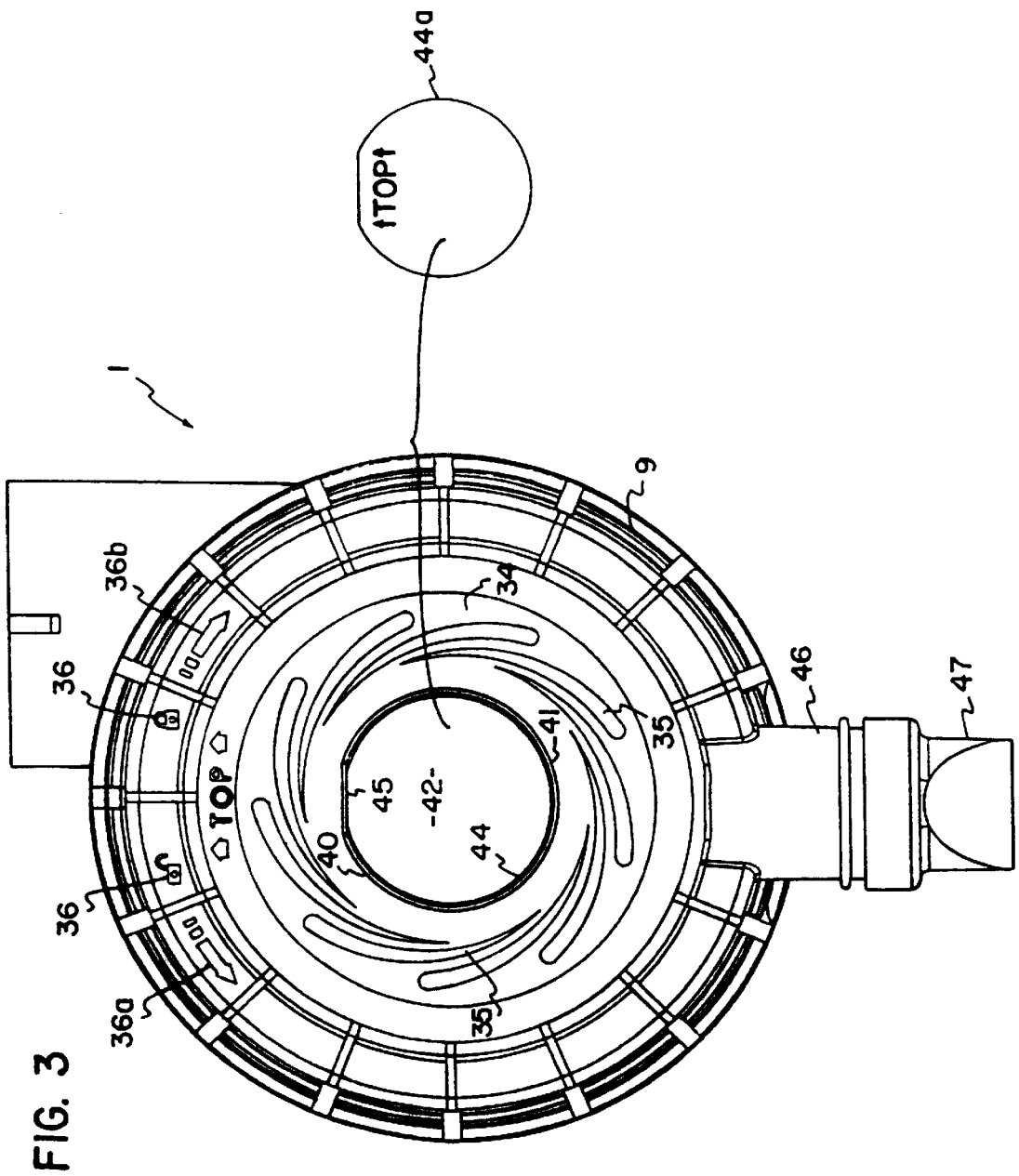
FIG. 3 is a right side elevational view of the air cleaner housing of FIG. 1A, and depicting certain ornamental features on the housing cover.

Attention is now directed to FIG. 3, in which a right side elevational view of assembly 1 is depicted. In FIG. 3, exterior end surface 34 of cover 9 is viewable. At 35, a distinctive swirl figure molded into cover 9 is shown. The swirl FIG. 35 serves no utilitarian function in connection with filtering operation of the assembly 1, but rather provides for a distinctive appearance. It is noted that, in the preferred embodiment shown, end surface 34 extends as a cover to the end of the housing and has no apertures therethrough.

Also shown in FIG. 3 on an exterior of end surface 34 of cover 9 is molded certain indicia 36. The molded indicia 36 provides instruction in connection with a service operation to be formed on air cleaner assembly 1. In particular, indicia 36a indicate instructions for moving (rotating) the cover 9 to unlock or disconnect the cover 9 from the body member 8; and, indicia 36b indicate instructions for moving (rotating) of the cover 9 relative to the body member 8 in order to achieve a locking engagement therebetween.

Still referring to surface 34, attention is now directed to molded feature 40. Molded feature 40 comprises a perimeter ridge 41 defining a central flat area 42. Perimeter ridge 41 preferably defines a geometric figure or perimeter which is not "rotationally" symmetric. The particular perimeter 41 depicted is circular in portion 44, but flat at region 45.

It is perceived that, in typical uses, labels (44a) or pad printing will be used to provide information in flat area 42. The lack of circular or rotational symmetry with respect to the configuration of perimeter ridge 41 can be used to help index information location, for example, label position. Labels that would fill flat area 42 circumscribed by perimeter ridge 41, would need to be noncircular (and non-radially symmetric) to fill the area. Thus, the information could be indexed relative to a flat edge of the label, for securing the label to the cover 8. It is anticipated that typically the information would be printed on the label in a position, relative to flat edge, so that after assembly on a vehicle, the information will appear substantially upright to a reader. As an example, a label 44a with the word "top" and direction arrows is shown. An installer would know to position the air cleaner 1 on a vehicle with the arrows pointed generally up.

For the arrangement shown, circular section 44 extends through a radius of 35 mm, with flat area 42 defining a chord 45 extending under a 35°–55°, preferably, a 45° arc.

Figure 2:
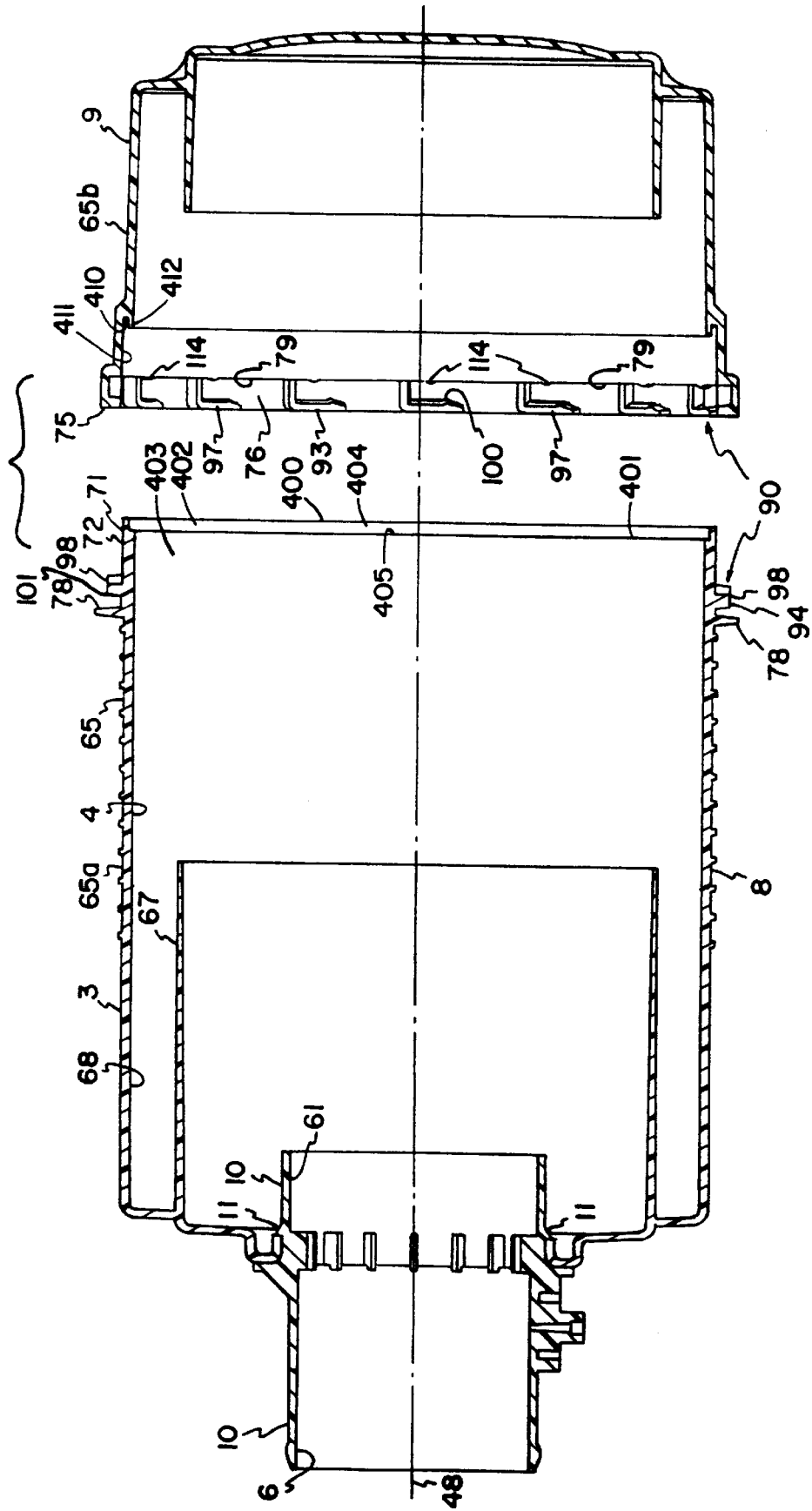
FIG. 2 is an exploded, cross-sectional view of the air cleaner housing depicted in FIG. 1A, taken and shown generally along line 2—2 without any internal filter element assembly therein.

A reason why appropriate rotational positioning of the air cleaner assembly 1 can be important will be understood by reference to FIG. 1. In FIG. 1, cover 9 is shown having a particulate exhaust tube 46 thereon. Exhaust tube 46 is provided with an exhaust cover 47. In general, it is preferred that the exhaust tube 46 be directed downwardly, so that as particulate material collects within cover 9, it can be readily expelled outwardly and downwardly through tube 46. Exhaust tubes generally of the type shown in FIG. 1 are known, see for example U.S. Pat. No. 5,545,241 incorporated herein by reference. It is noted that the particular design of the tube 46, FIG. 1, differs from those of the U.S. Pat. No. 5,545,241 patent in that the tube 46 extends orthogonal (at a 90° angle) relative to longitudinal axis 48. The tube of U.S. Pat. No. 5,545,241 extends outwardly from the housing at an acute angle relative to the longitudinal axis (i.e. at an angle of less than 90°). The approximately 90° or orthogonal extension of tube 46, FIG. 1, was selected for convenience. It is noted that exhaust tubes are optional and may not be used in some applications of the principles described herein.

As indicated previously, for the particular arrangement shown, outlet tube 10 is a separate piece from a remainder of housing 2, and is snap fit into body member 8. The particular outlet tube 10, depicted has a "straight" axial extension. That is, in passage through outlet tube 10 air leaving housing 2 moves in the direction of longitudinal axis 48. The snap fit results from annular bead or rib 11, FIG. 2.

Figure 12:
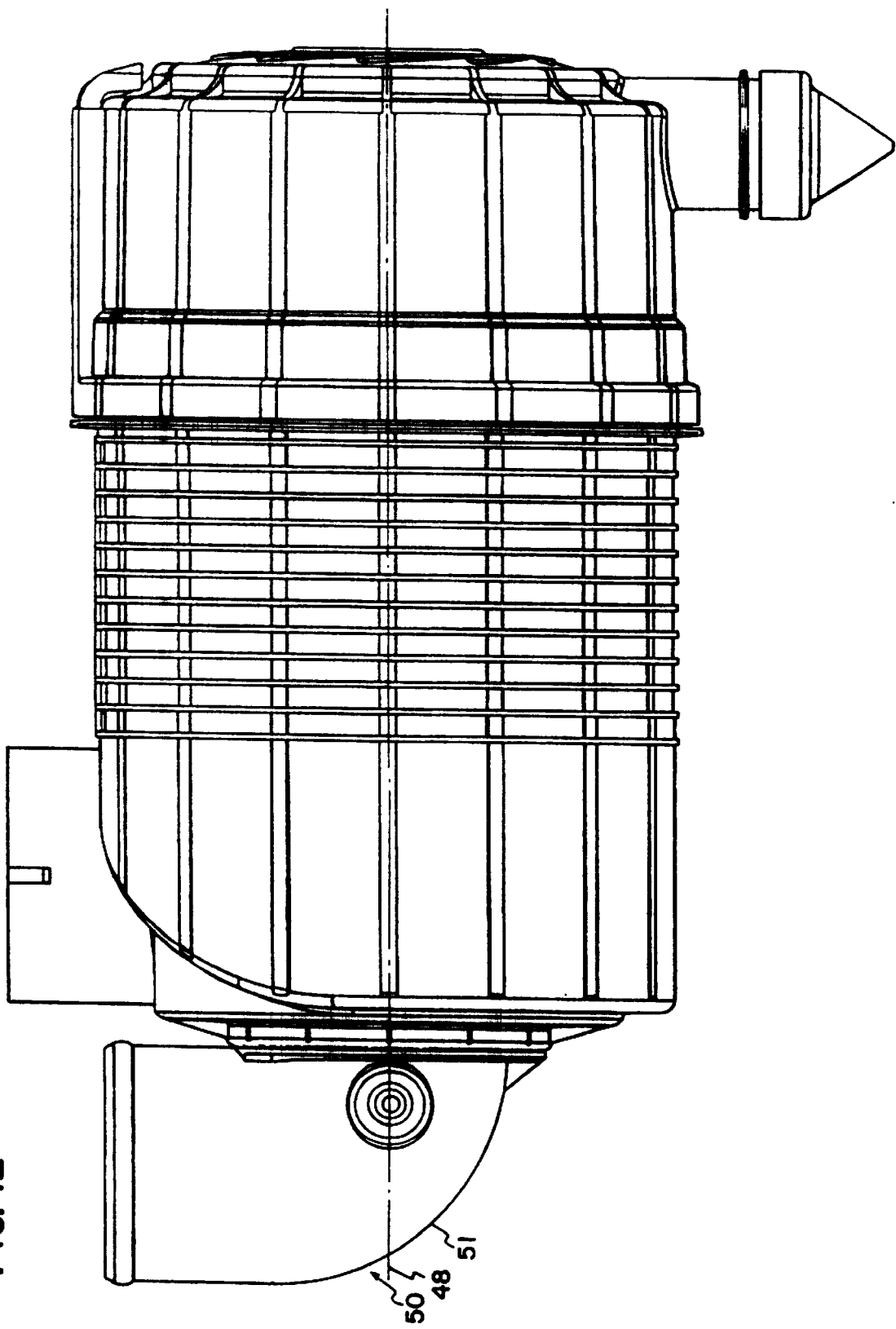
FIG. 12 is a front side elevational view of a third housing for an air cleaner depicted in U.S. Ser. No. 08/928,684, analogous to that shown in FIGS. 1A and 8.
Figure 13:
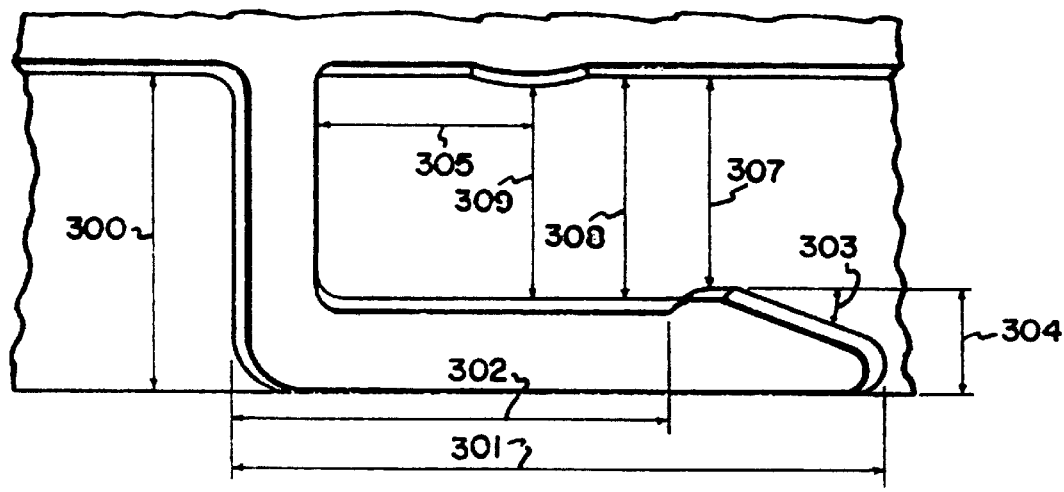
FIG. 13 is an enlarged, fragmented, side elevational view of a socket or foot arrangement useable in various embodiments, and depicting certain dimensional lines.
Figure 14:
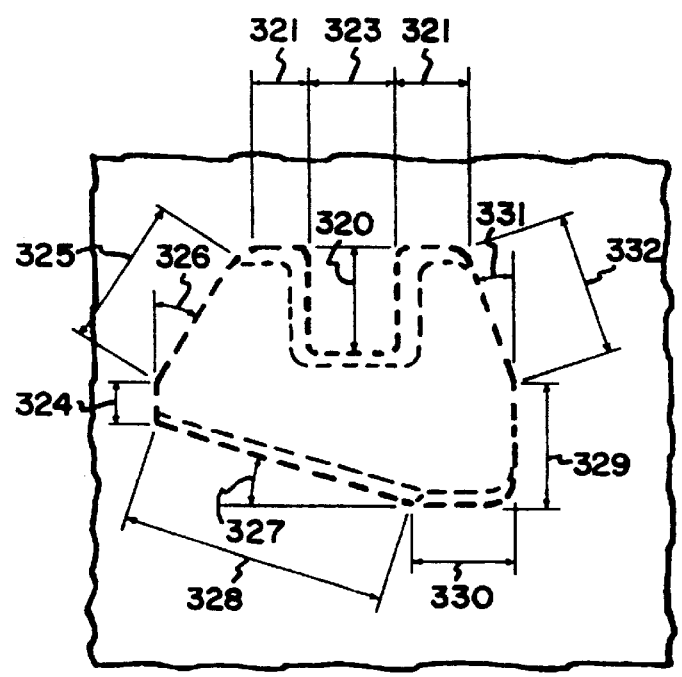
FIG. 14 is an enlarged, fragmented, somewhat schematic, side elevational view of a lug or holder useable in the embodiments of U.S. Ser. No. 08/928,684, and depicting certain dimensional lines.

In FIG. 12, an alternate outlet configuration to those is shown at 50. Outlet tube 50 is a "90° exit" tube. It can be seen that if outlet 50 is positioned in place of outlet tube 10, air exiting housing 2 will first move in the direction of axial line 48 and then will be turned, as a result of bend 51, through a 90° turn. It is noted that the arrangement of FIG. 12 includes other optional modifications to the assembly of FIG. 1, as discussed below.

Although a variety of alternate configurations may be used, it is foreseen that for typical applications and convenient attachment of downstream tubes and other equipment, either a straight tube configuration as shown in outlet tube 10, or a 90° bend outlet tube 50, will be used. By utilization of appropriately molded snap fit configurations, assembly 1 can be configured as either one. That is, typically the features of body member 8 and cover 9 would be the same, regardless of which type of outlet tube, i.e. outlet tube 10 or outlet tube 50, is used.

Figure 4:
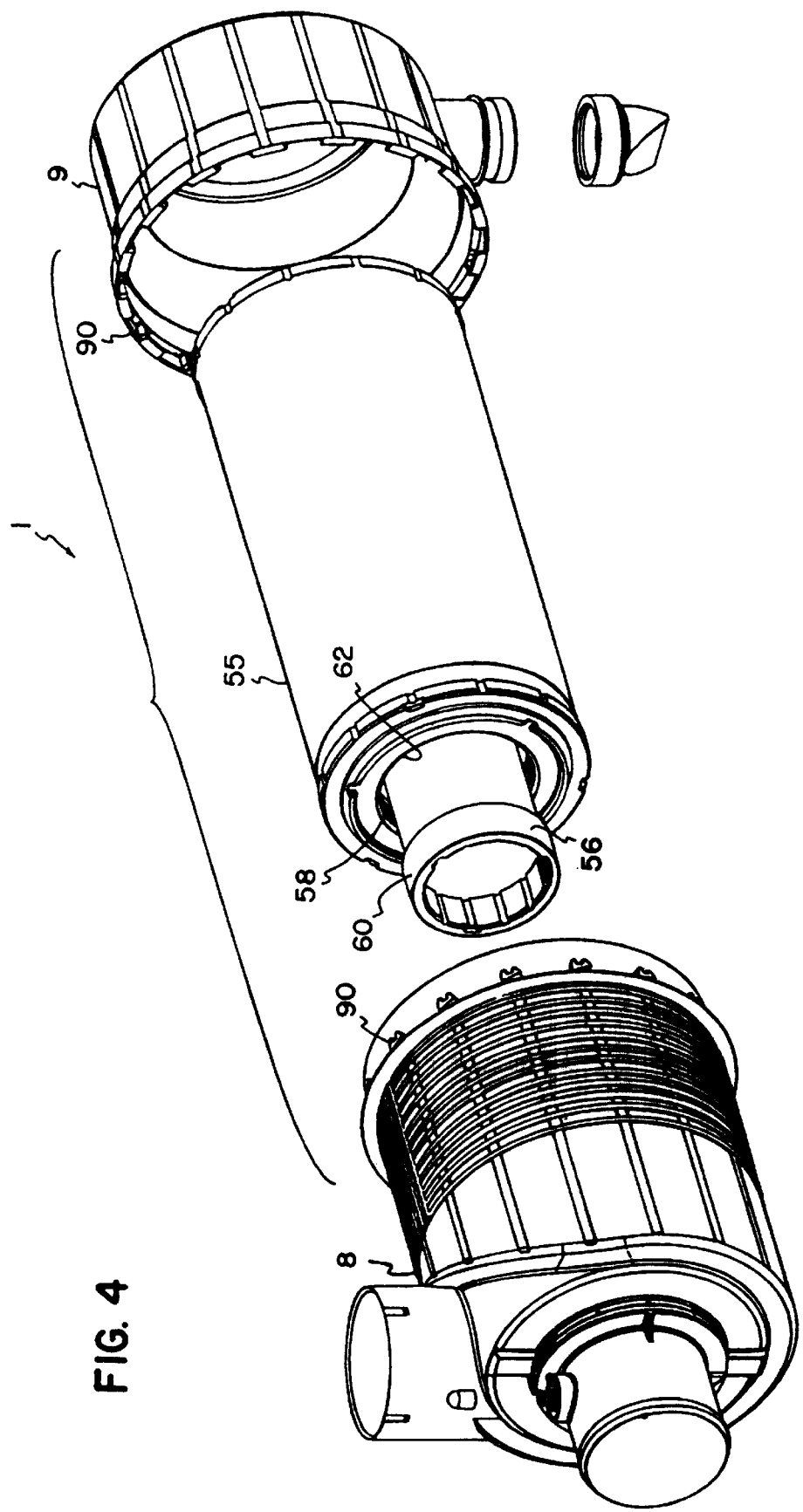
FIG. 4 is an exploded, perspective view of the air cleaner of FIG. 1A, and depicting an internal filter assembly therein.

Attention is now directed to FIG. 4. In FIG. 4. an exploded perspective view of air cleaner assembly 1 is depicted. Attention is directed to internally received filter element 55 and safety element 56. Although a variety of filter element configurations and safety element designs may be used, the ones depicted in FIG. 4 are typical. It is noted that locking assemblies according to the present description may also be utilized with air cleaners that do not have safety elements.

The filter element 55 may be of the general type previously sold by Donaldson Co., Inc. of Bloomington Minn., the assignee of the present invention. Such filter elements typically include a Donaldson radial seal feature in region 58. That is, material in region 58 would be compressed against a portion of the outlet tube, during assembly. Certain principles relating to such seals are described in EP 0329659, incorporated herein by reference. For Donaldson Co., it may also be preferred to include indicia on the filter element analogous to indicia 35, FIG. 3, to facilitate recognition of relationship.

Safety element 56 is a conventional safety element such as the type previously sold by Donaldson Co., Inc. Safety element 56 includes, in region 60, an external radial seal. Sealing of safety element 56 in position is accomplished by compressing material in region 60 within the inside of a portion of 61 (FIG. 2) of the outlet tube 10 (50 in FIG. 12). Note that the safety element 56 is sized and configured to be received within an open internal volume 62 of the primary filter element 55 during assembly. Element 55 can be removed without removing safety element 56.

Attention is again directed to FIG. 2. In FIG. 2, no installed element is shown.

Referring to FIG. 2, note that the outer sidewall 65 of housing 2, which in use circumscribes a filter element, is formed in part by body member 8 (i.e. sidewall section 65a) and cover 9 (i.e. sidewall section 65b). That is, portions of the longitudinal extension of sidewall 65 are provided by both the body member 8 and cover 9.

Still referring to FIG. 2, body member 8 includes internal, circular or cylindrical, deflector flange 67. As air enters through inlet 5, FIG. 1, it is directed, in part, against deflector flange 67. Preferably, inlet 5 is oriented "tangentially", so that as air is directed against deflector flange 67, it is directed in a circular helical or cyclonic pattern alone inside 68 of sidewall 65. To facilitate development of a "cyclonic" pattern, body member 8 includes internal ramp 69 (FIG. 1) therein. Features such as deflector flange 67 and internal ramp 69 have been used in previously existing Donaldson air cleaner systems, such as shown in U.S. Pat. No. 5,545,241 incorporated herein by reference.

Still referring to FIG. 2, sidewall section 65a of body member 8 includes end portion 71. End portion 71 has a ring configuration defining surface 72.

Similarly, sidewall section 65b of cover 9 includes end portion 75 with ring surface 76. During assembly, ring surface 76 engages or faces ring surface 72. Herein, ring surface 76, which is generally cylindrical in configuration, will sometimes be referred to as the "body member engaging surface" of end portion 75 (or cover 9); and ring surface 72, which is also generally cylindrical in configuration, will sometimes be referred to as the "cover engaging surface" of end portion 71 (or body member 8). For the particular arrangement shown, during assembly, ring surface 76 circumscribes ring surface 72 in opposed or juxtaposed or overlapping orientation, spaced sufficiently for positioning of portions of a locking assembly, described below, therebetween.

Sidewall section 65a further includes radial flange or projection 78 thereon. Flange 78 is directed radially outwardly from surface 72 preferably orthogonal to axis 48. Flange 78 provides a stop to movement of end 75 over body member 9 during closure. Flange, or shoulder 79 provides an analogous stop since it will be abutted by holders 98 as described below.

The Locking Assembly

Attention is now directed to FIGS. 2 and 5–7. According to U.S. Ser. No. 08/928,684, the air cleaner assembly 1 is provided with a locking assembly 90. The locking assembly provides for a locking engagement between the cover 9 and body member 8, when selected. That is, the locking arrangement has a locked or locking orientation; and, an unlocked orientation. When in the unlocked orientation, the body member 8 and cover member 9 are easily separated from one another by relative axial movement of one verses the other, typically axial movement of the cover 9 away from the body member 8. On the other hand, when the locking assembly 90 is in the locked orientation, separation of the cover 9 from the body member 8 is inhibited. More specifically, axial movement of cover 9 from the body member 8 is prevented; and, preferably, sufficient inhibition to rotational movement between the cover 9 and body member 8 is provided so that unintended separation (after unlocking) does not occur.

Locking assembly 90 is configured to operate by movement between the locked and unlocked orientation upon relative rotational movement of the cover 9 with respect to the body member 8. As a result of this configuration, the particular locking assembly 90 of preferred arrangements characterized herein is a "rotation activated" or "rotation actuated" assembly. By the terms "rotation actuated" and "rotation activated" it is meant that operation between locked and unlocked orientations occurs by rotational movement of one or the other of the cover 9 and body member 8 with respect to the other. Typically, when the air cleaner assembly 1 is mounted upon a vehicle, the selected movement will be rotational movement of the cover 9 with respect to the stationary body member 8. That is, the body member 8 will be secured in position by a mounting bracket such as mounting bracket 20 (FIG. 16), and it is the cover 9 which will be rotated and moved to allow access to interior 4 of housing 2 (FIG. 2).

The particular preferred locking assembly 90 depicted is a "lug-and-socket" or "foot-and-holder" locking assembly 91. The foot and holder locking assembly 91 includes a socket or foot portion 93, FIG. 2, and a lug or holder portion 94. For the particular preferred arrangement shown, the socket or foot portion 93 comprises a plurality of radially spaced sockets or feet 97 positioned on the cover 9; and, the lug or holder portion 94 comprises the plurality of radially spaced lugs or holders 98 positioned on the body member 8. The sockets or feet 97 and lugs or holders 98 are preferably configured and oriented with respect to one another for a selected engagement and disengagement upon operation of the locking assembly 90. For the arrangement shown, a lug or holder 98 is positioned for engagement for each one of the feet 97, and vice versa, during locking. Preferably each one of the sockets or feet 97 includes a portion 100 which, in use, locks behind or around a portion 101 of a lug or holder 98. Also, preferably each lug or holder is engaged by a socket or foot. Thus, in certain preferred systems there are an equal number of holders (lugs) and feet (sockets). Preferred configurations for the sockets or feet 97 and lugs or holders 98 are provided for advantageous operation.

Figure 5:
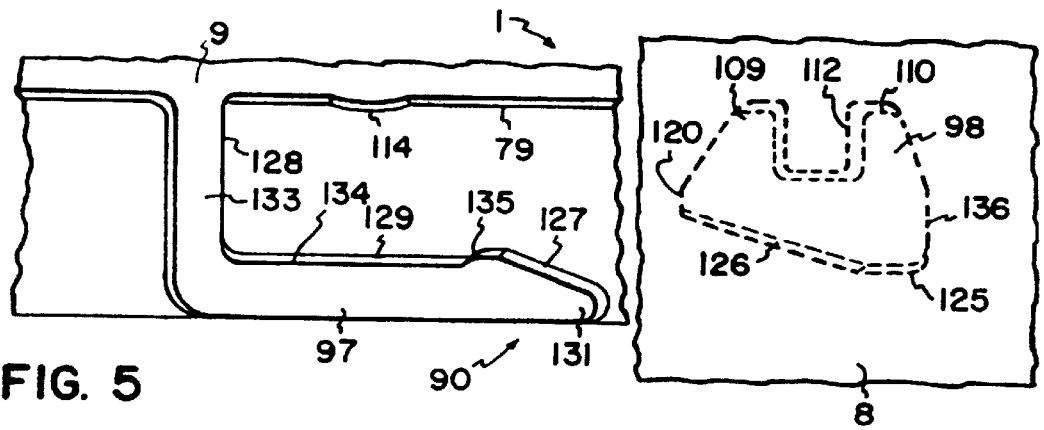
FIG. 5 is a fragmented, enlarged, side elevational, somewhat schematic view of a locking arrangement for the air cleaner housing depicted in FIGS. 1–4, in an unlocked position and prior to engagement.
Figure 6:
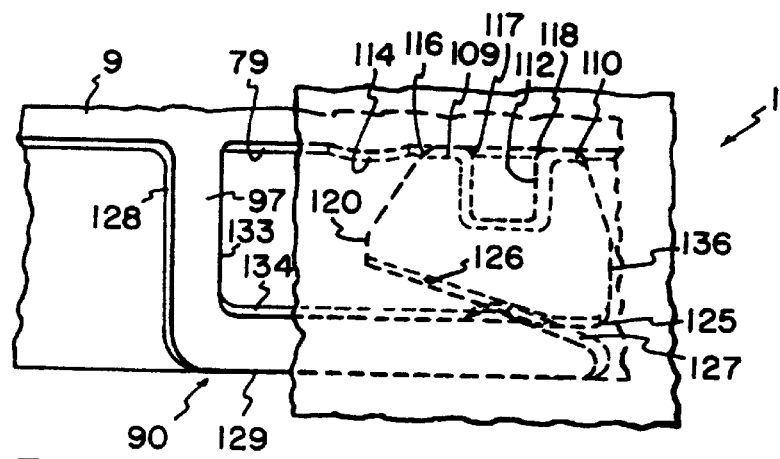
FIG. 6 is a view of the locking arrangement analogous to that shown in FIG. 5, depicting the locking arrangement during engagement.
Figure 7:
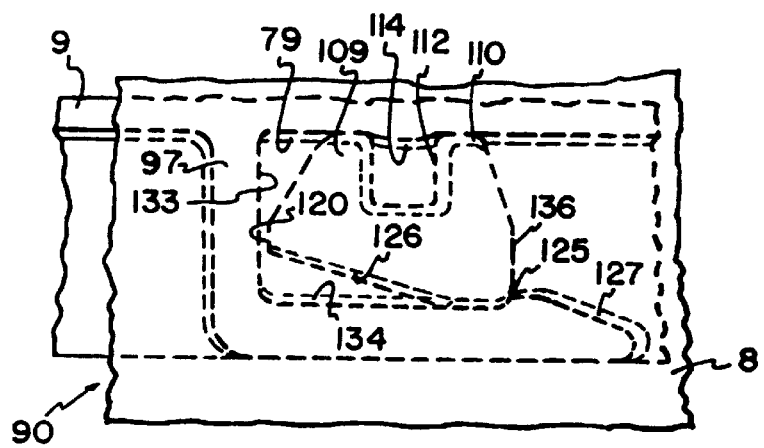
FIG. 7 is a view of the locking arrangement analogous to that shown in FIGS. 5 and 6, depicting the locking arrangement in a locked position and after full engagement.

Attention is now directed to FIGS. 5–7 in which one of the lugs or holders 98 is depicted. In FIGS. 5–7, portions of the lug 98 are shown in broken lines in part because the portions schematically shown are being viewed from an "inside" orientation, i.e. through a portion or flange 72 which has been removed to facilitate examination. Each holder 98 preferably comprises a projection extending radially outwardly from surface 72 (FIG. 2) and spaced from flange 78 (FIG. 2). Each holder 98, FIGS. 5–7, includes a pair of spaced projections 109 and 110 having central concave area, recess, or slot 112 positioned therebetween.

Preferably flange 79, FIGS. 2 and 5–7, includes a plurality of spaced projections, detents or beads 114 thereon; each detent or bead 114 being positioned to align with a corresponding recess or slot 112 in a selected holder 98, during locking engagement. The detents or beads 114 are preferably of a size and shape to project at least partially into slot 112 upon locking, for frictional engagement or resistance to unlocking rotation. Preferred detents or beads, as shown in FIG. 2, are curved bumps in configuration.

Referring again to FIGS. 5–7, the projection 109 includes rounded surface 116 thereon to facilitate engagement with detent or bead 114, during locking; and, rounded surface 117 thereon to facilitate disengagement, during unlocking. A curved surface 118 on projection 110 also facilitates disengagement. Preferred relative configurations of the detent or bead 114 and projections 109 and 110, for a secure engagement, are shown in FIGS. 5–7. Preferred relative dimensions of the parts are described hereinbelow.

Referring still to FIGS. 5–7, lug or holder 98 further includes rear surface 120 thereon. Rear surface 120 is positioned to abut a locking surface, specifically surface 133, of an associated socket or foot 97, during assembly.

Still referring to FIGS. 5–7, adjacent rear surface 120 and extending forwardly toward tip 125, lug or holder 98 includes cammed surface 126. Cammed surface 126 is angled and sized to be readily slid along portion 127 of socket or foot 97, during locking engagement.

Attention is now directed to FIG. 5. In FIG. 5, a socket or foot projection 97 is depicted. The foot projection 97 includes two general sections indicated at 128 and 129. Section 128 provides a back stop at 133 to rotational locking movement. Section 129 projects from section 128 and extends or projects circumferentially. Section 129 is the portion which will be secured around or behind an engaged lug or holder 98, during locking. Thus, during locking, section 129 and bead 114 are located on opposite sides of holder 98. Preferably, the foot projection 97 comprises a molded projection extending out of flange 79. In this context the term "extends or projects circumferentially" and various thereof means that the longitudinal projection of section 129, from section 128, is generally circumferential. That is, section 129 does not substantially project, in longitudinal extension, toward or away from central axis 48, FIG. 2, relative to section 128.

Still referring to FIG. 5, section 129 includes tip 131, ramp or cammed surface 127 and recessed surface 134. Recessed surface 134 extends between section 128 and bump 135. Bump 135 comprises an end of cammed surface 127.

In use, rounded tip 131 is pressed against surface 126 of lug or holder 98, when engagement begins. The surface 126 of holder 98 slides along surface 127 of socket or foot 97, as engagement occurs. Eventually bump 135 of socket or foot portion 97 slides past rear surface 136 of lug or holder 98, at which point lug or holder 98 settles against recessed surface 134, generally secured between bump 135 and section 128 (surface 133). That is, an over-center lock is achieved. Detent or bead 114 is positioned so that when the level of engagement described in the previous sentence occurs, detent or bead 114 is positioned within recess or slot 112. When the parts are configured relative to one another appropriately, the net result of the motion described previously in this paragraph, is a snap fit, over-center, rotational locking engagement between the socket or foot 97 and the lug or holder 98. Unlocking can be readily accomplished by a reverse rotational movement with sufficient force to overcome resistance provided by rounded bump 135 and rounded detent 114.

Motion between locking and unlocking will be understood by reference to the positions indicated in FIGS. 5, 6, and 7. Progression from FIG. 5 toward FIG. 7 is a generally "locking" movement; and, the first movement from FIG. 7 toward FIG. 5 would be unlocking. It can be seen by comparing FIGS. 5, 6 and 7 to FIG. 2, that the positioning which would accomplish the engagement disengagement of FIGS. 5–7 would be a rotational movement of cover 9 relative to body member 8.

It is foreseen that the components should be sized and configured such that in a locked position, FIG. 7, the engagement is snug but not tight. In spite of this, unacceptable levels of "rattling" of the cover 9 on the body member 8, during use, will not occur for typical systems. In some arrangements this will be because the filter element 55, FIG. 4, will typically have soft, compressible end cap members and will be oriented in size so as to be lightly compressed, in an axial direction, between the body member 8 and the cover 9. This light compression of the soft, compressible end caps will provide a dampening effect to rattling between the components shown in FIGS. 5–7. Conventional filter elements of the type described previously and available from Donaldson Company have compressible end caps sufficient for this effect, provided appropriate dimensions are chosen.

Preferred dimensions described in U.S. Ser. No. 08/928, 684 for the various components are described herein below.

It will be understood that in alternate arrangements, the lugs or holders could be positioned on the cover, and the sockets or foot members could be positioned on the body member; or, a mixture of the two could be positioned on each one. However, the specific arrangement described and shown in the drawings is convenient and advantageous both for manufacture and assembly.

For the arrangement shown, the holders and foot members are evenly radially spaced upon the body member 8 and cover 9, respectively. The spacing, on center, is about 22.5°, and there are 16 of each member. It is foreseen that variations are useable. Preferably, however, there will be at least 10 lugs or holders and 10 sockets or feet, within air cleaner arrangements of the sizes described herein. Most preferably, each socket (foot) is engaged by a lug (holder) and each lug (holder) is engaged by a socket (foot), during locking. Also, preferably, even radial spacing will be selected, so that specific rotational orientation between the cover 9 and body member 8 is not dictated, to a great extent, by the radial positions of the feet 97 and holders 98. That is, the convenient and secure closure can occur without substantial radial adjustment of the positioning of cover 9 verses body member 8.

In review of FIGS. 2 and 5–7, and the descriptions above, certain advantages to the preferred arrangement disclosed will become apparent. For example, the "locking assembly" could be referred to as "internal". That is, the components that interlock during locking, i.e., the lugs or holders 98, the sockets or feet 97, and detents or beads 14, are oriented such that, when assembled during locking, they are all positioned underneath the cover 9, with no aperture exposing them directly to the environment. That is, when the cover 9 is positioned on the body member 8, the components of the locking assembly identified are positioned underneath an outer surface 65b of the cover member 9, i.e., underneath an outer surface 65 of the housing 2. This means that they are not exposed to the elements. Thus, interference with the locking and unlocking operation due to the environment of use or the elements, for example, snow, ice, road tar, mud, etc., is not likely. Further, they are less likely to become damaged in the environment of use.

Also, the preferred configuration shown does not result in the generation of a substantial twisting or bearing force between the cover and the body member during the locked engagement. That is, there is not a pressure tending to press or twist the cover away from the body member after the locked orientation, FIG. 7. Rather, the lugs or holders 98 rest (and are trapped), over center, in recesses in the sockets or feet 97. This means that portions of the locking assembly, for example, the foot members, are not likely to become twisted, distorted, or sheared due to forces while locked. Alternately stated, the twisting or bearing force occurs briefly during passage over-center, but is relieved in the locked orientation.

Hereinbelow, some preferred dimensions for suggested lugs or holders and sockets or feet are provided. It can be seen that variations from these can be used. In general, the preferred dimensions given are for the preferred arrangement characterized, having an internal dimension of about 8 inches in diameter. Variations from that diameter, if substantial, may justify a proportional modification in certain dimensions of the corresponding lugs or holders and sockets or feet. However, in some applications, maintenance of the same dimensions and proportions, while varying overall diameters of the housing, will be possible. Similarly, if a diameter of the housing is reduced sufficiently, it may be desirable to have a fewer number than 16 of the lugs or holders and sockets or feet. This too will be a matter of design choice and relating to ease of molding and convenience of the sample.

For the preferred embodiment, each of the lugs or holders 98 and sockets or feet 97 is designed for convenient and efficient manufacturing techniques. Preferably, the lugs or holders 98 and sockets or feet 97 are injection molded, together with their respective housing components, i.e., the body member 8 and cover member 9. When injection molding, it is advantageous to include a draft angle on the manufactured components, in order to help demold the components. By "draft angle", it is meant that one of the surfaces of the component being manufactured is recessed or projects away at an angle from an opposite surface of the component being manufactured. In the preferred embodiment, the draft angle is from about 0.5–3 degrees, preferably about 1 degree.

An Engagement Finger (Optional)

Figure 8:
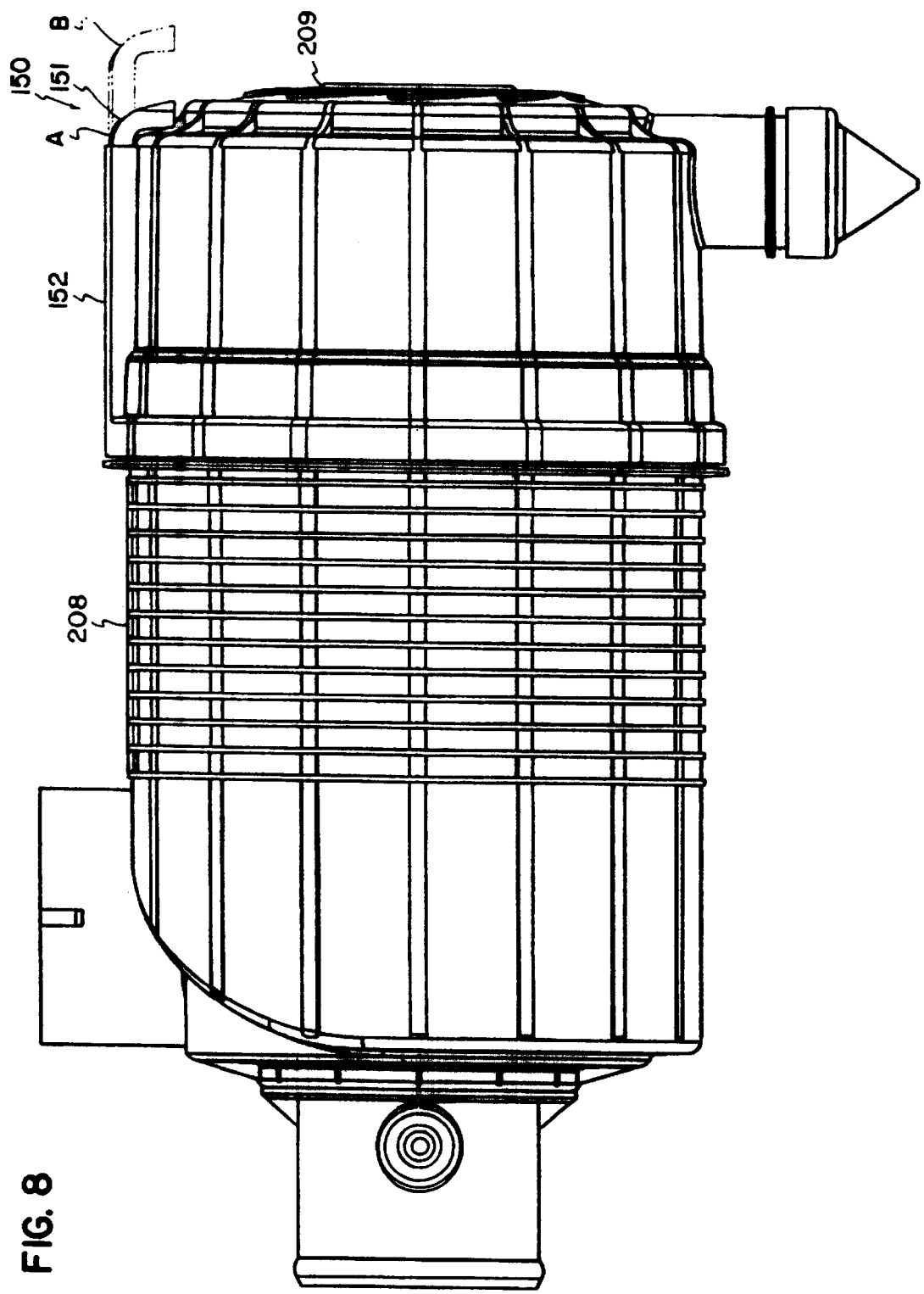
FIG. 8 is a front side elevational view of a second embodiment of a housing for an air cleaner depicted in U.S. Ser. No. 08/928,684, including a locking finger assembly.
Figure 9:
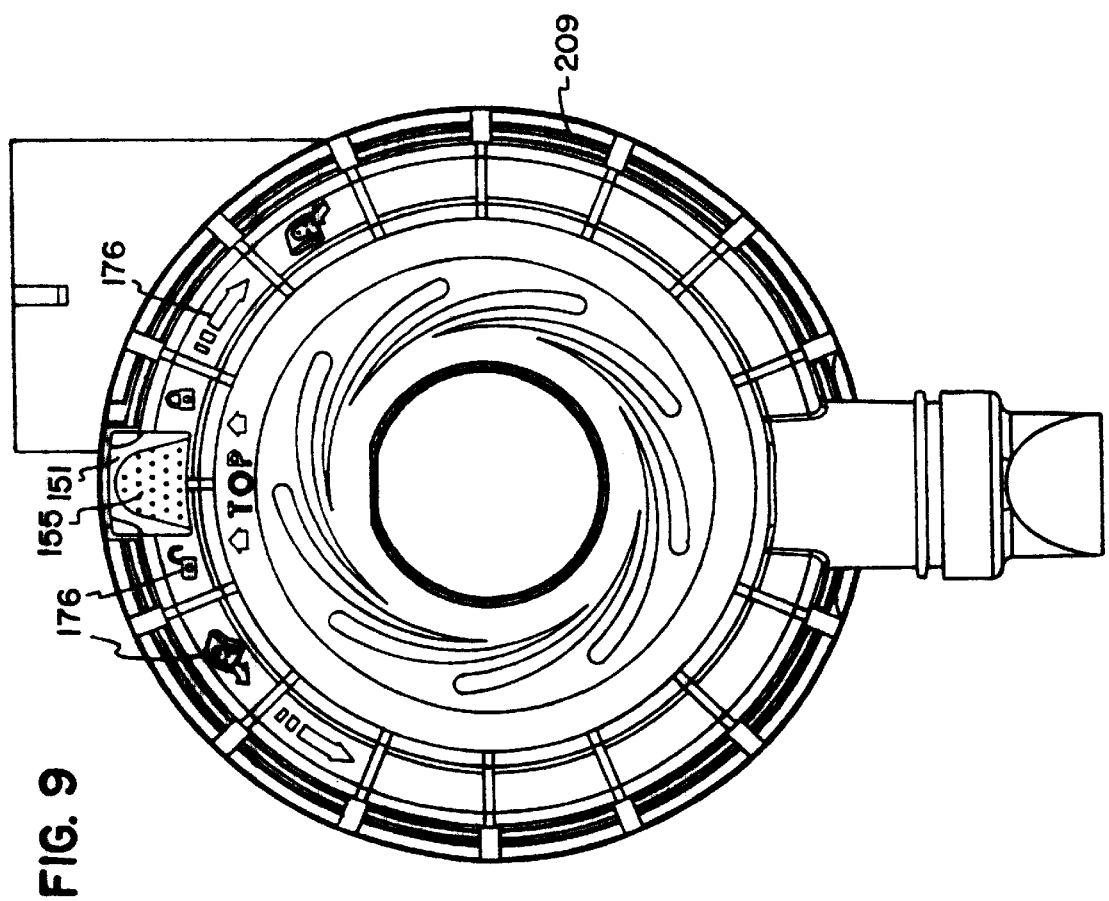
FIG. 9 is a right side elevational view of the air cleaner housing depicted in FIG. 8, and depicting certain ornamentation on the housing cover.
Figure 11:
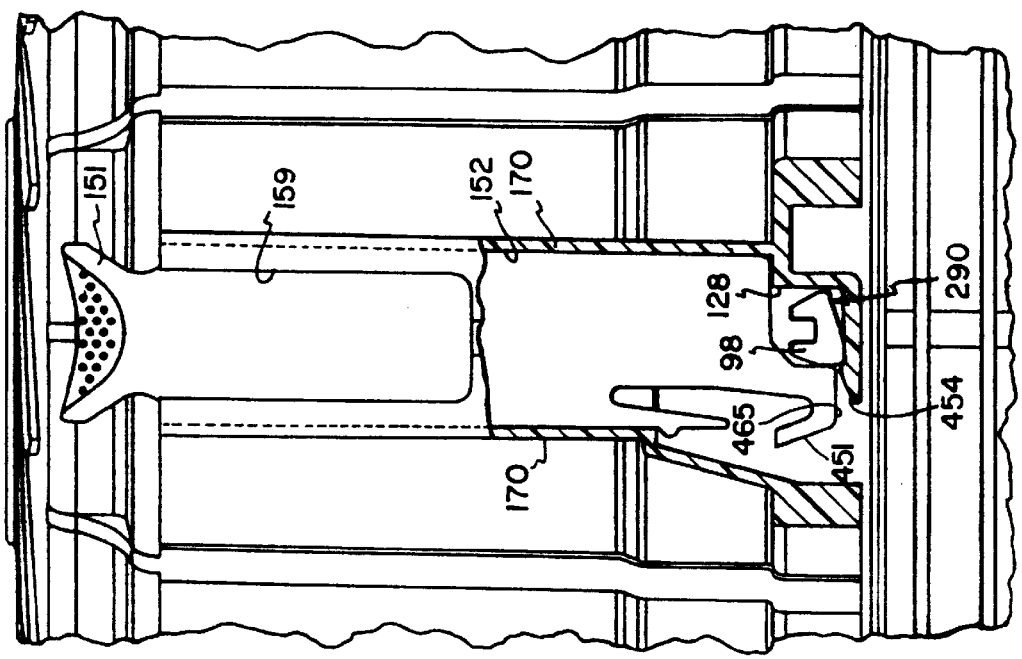
FIG. 11 is a view analogous to FIG. 10, depicting the locking finger in a locked or engaged position and the locking arrangement in a locked position.
Figure 10:
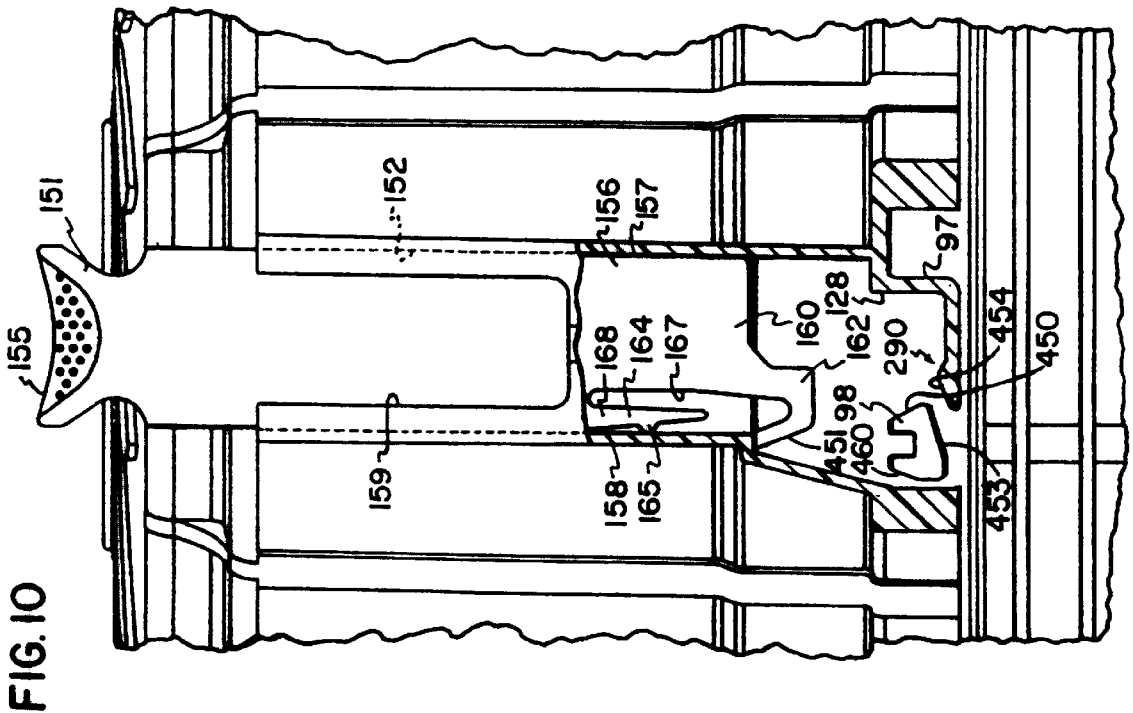
FIG. 10 is a fragmented, enlarged, partial cross-sectional, and somewhat schematic view of the locking finger assembly for the air cleaner housing depicted in FIG. 8, showing the locking finger assembly in an unlocked position and the locking arrangement in an unlocked position.

Attention is now directed to FIGS. 8–11. In FIG. 8, a cover including an optional engagement finger construction thereon is shown. More specifically, the arrangement of FIG. 8 includes an engagement finger assembly 150. The engagement finger assembly 150 includes a slideable engagement finger 151 mounted in slot or track construction 152. In the assembly 150, the slideable engagement finger 151 is readily slideable between two positions: a first, release, position (B); and, a second, engaged, position (A). When the slideable engagement finger 151 is in the release position, the cover 209 can be rotated relative to the body member 208, in order to lock or unlock the lock assembly. When the slideable engagement finger is in the engaged position, rotational movement of the cover 209 relative to the body member 208, in order to unlock or lock the locking assembly 290, FIGS. 10 and 11, is inhibited. In general, in FIG. 8, the slideable engagement finger 151 is shown in the locked orientation at A; and in the unlocked orientation at B.

The engagement finger assembly 150 operates by sliding a portion of the engagement finger 151 to a position on an opposite side of an associated lug or holder 98 from section 128 of an associated socket or foot member 97, FIGS. 10 and 11. Thus, the holder 98 becomes rotationally trapped between the slideable engagement finger 151 and the associated L-shaped foot 97, during engagement. When the slideable engagement finger 151 is slid to the disengaged position FIG. 10, the engagement finger 151 is moved out of the position blocking the rotational movement. Thus, rotational movement to unlock is possible.

Attention is directed to FIGS. 10 and 11. Referring to FIG. 10, the slideable engagement finger 151 includes: handle portion 155; shank portion 156, defined between side edges 157 and 158; and, bottom 160. Projecting from bottom 160 is curved finger extension 162; and projecting from edge 158 is tab 164 with outward bead or projection 165 thereon. Tab 164 and curved finger 162 define bay or recess 167, along a bottom portion 168 of edge 158.

In FIGS. 10 and 11, the finger 151 is shown mounted on the cover 209 within track 152. The wall of the cover 209 includes a U-shaped opening 159. The U-shaped opening 159 provides a window or an open space to allow the finger 151 to be visible. That is, the open space defined by the U-shaped opening 159 exposes a portion of the shank portion 156 to the external atmosphere. The edges of the U-shaped opening cover the track 152.

In operation, engagement finger 151 is slid into slot or track 152 having opposite sidewalls 170 which extend along opposite edges 157 and 158. The length of shank portion 156, relative to track 152, is generally selected so that the curved finger 162 projects beyond track 152 regardless whether the finger 151 is in the engaged or disengaged position.

Typically, finger 151 will be molded from a plastic material such as acetyl copolymer, available under the tradename Ultraform® N2320 from BASF, located at 3000 Continental Drive North, Mount Olive, N.J. 07828. As a result, tab 164 and curved finger extension 162 will flex somewhat. During assembly, then, tab 164 and finger extension 162 will compress slightly as they slide through track 152 and will expand after they exit the open end of the track. Bead or projection 165 will inhibit engagement finger 151 from unintentionally slipping through the track 152 until a force pulling handle 155 is applied.

It may be advantageous to have the finger 151 be a different color from the rest of the housing, to enhance visibility. For example, a yellow finger and a black housing may be utilized.

Preferably, curved finger extension 162 is sized and positioned so that it will extend, during engagement, to a position adjacent a portion of lug or holder 98, FIG. 11, when the slideable engagement finger 151 is in the engaged position. It can be seen that as a result, holder 98 becomes rotationally trapped between curved finger extension 162 and an engaged foot member 97, during locking of the lock assembly and engagement of the engagement finger assembly 150, preventing relative rotation between the cover 209 and the body member 208.

The engagement finger assembly 150 provides security to engagement of the cover 209 on the body member 208. However, it is not a requirement and is perceived as optional. That is, the locking assembly described herein, can be provided with appropriate resistance, to unlock, to ensure engagement, and retention of selected engagement even in the absence of a safety mechanism such as the engagement finger assembly.

Attention is now directed to FIG. 9. In FIG. 9, a right side elevational view of the arrangement shown in FIG. 8 is illustrated. The handle 155 of finger 151 is viewable. It can be seen that the handle 155 can be configured such that construction with respect to operation of the locking assembly is still viewable. Note that the end view shows indicia 176 for operation of the finger 151, as well as indicia for rotational operation of the locking assembly.

Attention is now directed to FIG. 12. FIG. 12 is a front side elevational view generally analogous to FIG. 9, but showing an optional alternate embodiment including curved outlet member 50. As described previously, such a curved outlet member could also be used with the embodiment of FIG. 1.

Specific Preferred Arrangements of U.S. Ser. No. 08/928,684

In this section of U.S. Ser. No. 08/928,684, an example was provided of a set of operating materials and specifications. These were intended as an example. A wide variety of alternate materials and sizes can be used.

The arrangement described would be particularly configured for use in a system with the following characteristics: typical air flow rate of about 100–220 CFM (about 2.8–6.2 cubic meters per minute); and typical pressure drop of about 4–8 inches of water (about 100–205 mm of water).

The filter element 55 has an outer diameter of about 135–140 mm, preferably about 138 mm, and an inner diameter of about 75–85 mm, preferably about 81 mm. The element 55 has an overall length of about 320–325 mm, preferably about 322 mm. It is a Donaldson P827653 primary filter element.

The body member 8 has a length of about 260–270 mm, preferably about 267 mm. It has an outer diameter at portion 71 of about 205–215 mm, preferably about 211 mm, and an inner diameter at portion 71 of about 205–210 mm, preferably about 207 mm. Each of the ribs 13 on body member 8 has a width of about 4–8 mm, preferably about 6 mm. There are about 16 ribs 13 on the body member 8. There are about 12 rings 14 on the body member 8, and each of the rings 14 is spaced about 5–15 mm, preferably about 10 mm, from an adjacent ring. Each of the rings 14 has an outer diameter of about 209–212 mm, and a width of about 1–3 mm, preferably about 2 mm. Flange 78 extends a distance of about 7–12 mm, preferably about 9 mm from the sidewall section 65 of the body member 8, and about 30–40 mm, preferably about 34 mm from the bottom of the body member 8 and adjacent to portion 71.

The deflective flange 67 has a length of about 125–135 mm, preferably about 132 mm, and an outer diameter of about 165–175, preferably about 170 mm. The distance between the inner wall of body member 8 and flange 67 is about 15–20 mm, preferably about 17 mm.

The inlet 5 has an outer diameter of about 90–100 mm, preferably about 95 mm. The outlet 6 has an outer diameter of about 85–95 mm, preferably about 89 mm, an inner diameter of about 80–90 mm, preferably about 85 mm, and a length of about 110–120 mm, preferably about 115 mm.

The cover 9 has a length of about 130–140 mm, preferably about 134 mm. At surface 76, the cover 9 has an inner diameter of about 210–215 mm, preferably about 213 mm, and an outer diameter of about 225–230 mm, preferably about 227 mm. There are about 16 ribs 13 on the cover 9.

The exhaust tube 46 has an outer diameter of about 55–60 mm, preferably about 57 mm, and an inner diameter of about 47–52 mm, preferably about 50 mm.

The body 8 and cover 9 are constructed from plastic, such as glass filled polypropylene; available under the tradename HiglassTM, from Himont Advanced Materials, located at 2663 Eaton Rapids Road, Lansing, Mich. 44911.

There are a total number of about 16 sockets or feet 97. In reference to FIGS. 5–7 and 13, section 128 has a length 300 of about 12 mm, and a width of about 2–3 mm, preferably about 2.4 mm. Section 129 has a length 301 to end tip 131 of about 21–22 mm, preferably about 21.6 mm and a length 302 to the edge of bump 135 of about 12–13 mm, preferably about 12.3 mm. Section 129 has a width of about 3 mm. Cammed surface 127 is on an angle 303 from a horizontal plane of about 22°. Cammed surface 127 has a length between bump 135 and tip 131 of about 9 mm.

The tip 131 is on a radius of about 0.9 mm. The recessed surface 134 of section 129 is angled about 1° from the planar surface of section 129.

Bump 135 is on a radius of about 1 mm. It has a height 304 from an edge of section 129 of about 3–4 mm, preferably about 3.5 mm.

The middle of detent 114 is at a distance 305 from section 128 of about 7–8 mm, preferably about 7.4 mm. It is on a radius of about 11–12 mm, preferably about 11.5 mm. It projects a distance of about 0.1–1 mm, preferably about 0.2 mm from section 128.

Sockets or feet 97 have a distance 307 of about 8–9 mm, preferably about 8.5 mm from bump 135 to flange 79. It has a distance 308 of about 9 mm between section 129 and flange 79. It has a distance 309 of about 8–9 mm, preferably about 8.2 mm between section 129 and bump 114.

Each of sockets or feet 97 curve along in the inner rim of cover 9 over an angle of about 11–12°, preferably about 11.70, from outside of section 129 to end tip 131.

There are about 16 lugs or holders 98. In reference now to FIGS. 5–7 and 14, each projection 109 has a length 320 of about 3–4 mm, preferably about 3.5 mm and a width 321 of about 2 mm. Each of projections 110 has a length 320 of about 3–4 mm, preferably about 3.5 mm, and a width 322 of about 2 mm.

The slot 112 has a length 320 of about 3–4 mm, preferably about 3.5 mm, and a width 323 of about 4–5 mm, preferably about 4.2 mm. This defines an area of about 14–15 sq. mm, preferably about 14.6 sq. mm.

The rear surface 120 has a length 324 of about 1–2 mm, preferably about 1.1 mm. The surface between rear surface 120 and curved surface 116 has a distance 325 of about 5 mm. It is angled from the vertical at angle 326 of about 30°.

Cammed surface 126 extends at an angle 327 from the horizontal of about 16°. It has a length 328 of about 9–10 mm, preferably about 9.6 mm.

The rear surface 136 has a length 329 of about 4–5 mm, preferably about 4.1 mm.

The distance 330 between tip 125 and cammed surface 126 is about 2–3 mm, preferably about 2.9 mm. The surface between rear surface 136 and projection 110 has a distance 332 of about 4–5 mm, preferably about 4.3 mm, and an angle 331 of about 21°.

The lugs or holders 98 have slanted walls, i.e., a draft angle, which slant at an angle of about 1°. That is, in order to help demold the lugs or holders 98, one of the planar surfaces is recessed or projects away at an angle of about 1° from an opposite planar surface.

The lugs or holders 98 project about 5–6 mm, preferably about 5.5 mm from the exterior surface of the body 8. The distance between the end tip of portion 71 and the rear surface 120 is about 21–22 mm, preferably about 21.5 mm.

Finger 151 has a length from handle portion 155 to an end of extension 162 of about 125–135 mm, preferably about 130 mm. It has a width across shank portion 156 of about 29–30 mm, preferably about 29.6 mm. The tab 164 has a length of about 18–22 mm, preferably about 20 mm, and across its widest portion a width of about 5–6 mm, preferably about 5.4 mm. The bead 165 is on a radius of about 1–2 mm, preferably about 1.5 mm and projects about 1–2 mm, preferably about 1.5 mm from the tab 164. The extension 162 extends a distance of about 1–5 mm, preferably about 3 mm beyond the edge of the track 152, when the finger 151 is in the locked position.

II. SOME FURTHER OBSERVATIONS REGARDING THE ARRANGEMENTS DISCLOSED IN U.S. Ser. No. 08/928,684

In this section, some further comments and observations are made with respect to the arrangements described in U.S. Ser. No. 08/928,684. These comments generally concern further observations made with respect to features disclosed in the drawing; and/or observations made based upon further study of the systems described.

Attention is first directed to FIG. 2. As shown in FIG. 2 of U.S. Ser. No. 08/928,684 the end 71 of body member 8 defines an outer edge 400. The outer edge 400 defines the open end of the body member 8, for receipt of an element therein during use.

End 72 not only includes outer edge 400, but step or recess 401. Step or recess 401 is defined by the following features: an internal diameter in region 402 which is larger than an internal diameter in region 403. The preferred arrangement such as the one depicted in FIG. 2, the size of the step would be at least 0.5 mm, typically 1.0 to 3.0 mm. Preferably, for the arrangement shown, the thickness of the edge 400 in region 402 is about 1 to 3 mm, typically about 1–2 mm.

As shown in FIG. 2 of U.S. Ser. No. 08/928,684 at 400, a result of the different internal diameters of regions 402 and 403 is a definition of a narrow lip 404 and an internal shelf 405. Also as shown in U.S. Ser. No. 08/928,684. in the cover 9 is positioned an internal recess 410, oriented aligned to receive lead edge 404 therein. The recess 410 is defined between outer wall 411 and internal projecting ring 412. Ring 412 is generally oriented to align with shelf 405, when cover 9 is operably placed on body member 8 to close the housing 2.

In use, engagement between edge 404 and slot or recess 410 provides for a preferred weather seal to inhibit passage of water through the housing wall along the seam or joint between the cover 9 and the body member 8.

Note that for the arrangement shown in FIG. 2, the projection of edge 404, and the recess 410, is to a position well spaced from the locking mechanism, and projects well within end cover 9 from the outer edge 75, during assembly. This means that there will be substantial overlap of end region 72 with surface area 411, ensuring a good fluid seal against passage of moisture. For preferred arrangements such as those shown in U.S. Ser. No. 08/928,684, preferably recess 410 is positioned at least 15 mm, typically 25 to 40 mm, inside of cover 9 from end 75. Most preferably recess 410 is positioned about 34 mm from end 75.

In comparing FIGS. 1A and 2, of U.S. Ser. No. 08/928,684 it will be understood that in the preferred arrangement disclosed in that reference, the flange 78 is positioned such that when edge 404 is positioned in slot 410, as cover 9 is positioned over body member 8, end 75 is brought into an aligning relationship with the flange 78. The end 75 does not necessarily abut i.e. touch, flange 78. However, preferably the gap or space between end 75 and flange 78, when cover 9 is mounted on body member 8, is not greater than about 5 mm, and preferably is less than about 2 mm, typically between 1–2 mm. When this occurs, flange 78 operates to substantially close an otherwise open end of end 75 against passage of a substantial amount of dirt, snow, etc., between the cover 9 and the body member 8, in the location of the locking assembly 90. This was referenced more generally in U.S. Ser. No. 08/928,684 when it was described that the twist lock mechanism was generally an internal or internally received arrangement.

In general, it has been found that, for preferred systems, the cover 9 and body member 8 should be sized and positioned, for easy twisting motion with minimal resistance. In U.S. Ser. No. 08/928,684, it was discussed that in some axial systems it may be desirable to utilize a filter element with an appropriate length and with soft axial protrusions to cause some compression against the cover 9, in an axial direction, in order to inhibit "rattle" between the cover 9 and the body member 8. In general, it has been found that such a compression by the filter element can lead to undesirable amounts of resistance to easy alignment of, and rotation of, the cover 9 relative to the body member 8, in moving the arrangement between the locked and the unlocked positions. Thus, preferably the filter element is sized so that a substantial amount of compression when the cover 9 is placed above the body member 8, does not occur. Preferably the filter element is sized relative to the housing so that either there is a line-to-line alignment between the filter element and the cover 9; or, so that the dimensions are such that the filter element is simply shorter in length, than the distance between the opposite internal end surfaces of cover 9 and the body member 8.

With respect to minimization of rattle, in general it has been found that when appropriate tolerances for the sizes and relative parts of cover 9 and body member 8 are chosen, preferred material such as polypropylene plastics, or in some instances reinforced polypropylene, or alternatively, nylon can be molded to tolerances such that undesirable levels of rattle do not occur. Lack of rattle is also facilitated by the finger lock or engagement mechanism, when used.

In some instances it is also possible to reduce the amount of resistance to rotation, by utilizing "over center" locking systems on fewer than all of the foot and holder interactions. In this manner the amount of torque necessary to cause the rotation can be reduced. In general, when reduction in over center locking occurs, undesired rotation of the cover 9 from the body member 8, during the operation of the air cleaner, can be minimized by also using a locking mechanism such as the finger engagement lock. In the alternative, if no finger engagement lock is desired, higher amounts of frictional resistance between the feet and holders can be designed into the system.

With respect to issues of frictional resistance to rotation, it is noted that with relatively large amounts of frictional resistance, larger diameter arrangements can be difficult to rotate by hand. Thus, it will be preferable for larger arrangements to have, relatively speaking and on average with respect to each holder/foot interaction, lower amounts of frictional resistance to rotation, with the concomitant use of a mechanism such as the finger locking engagement described above, to inhibit undesired back rotation or unlocking. On the other hand, with smaller diameter arrangements, for example, on the order of about 4 inches or 5 inches in diameter, even if each foot or holder engagement involves one or more sites of over center frictional (or resistance) engagement, a person can typically readily rotate the cover, with the strength of one arm or hand, to unlock or lock the arrangement, especially if dimensions for the foot and holder arrangement such as those described previously herein above are used. Indeed, for such small sized housings, especially about 5 inches in diameter or smaller, it may be preferred in some instances not to use the finger locking mechanism because a sufficient amount of frictional resistance to rotation can be built into the system to significantly reduce the incidence of undesirable unlocking during use, yet still have the system provide a level of frictional resistance that can be readily overcome by the strength of a human operator, with one arm or hand.

As is apparent from review of U.S. Ser. No. 08/928,684, there is, in general, no requirement that each foot have an associated holder, or each holder have an associated foot. By varying the relative numbers of the two, reductions in the amount of frictional resistance to rotation can be made. This is because each interaction between a foot and holder (which also utilizes a frictional or over center resistance interaction) adds to the overall resistance to rotation and thus force required to cause the cover to move between a lock and unlock orientations. By not changing the nature of the interaction between each foot and holder, but rather changing the number of feet or the number of holders, the total or sum total of frictional interaction, and thus resistance to rotation, can be readily and controllably adjusted.

Attention is directed to FIGS. 10 and 11, and cammed and/or recessed surfaces which appear in the holder 98. Recessed surface 450, described in U.S. Ser. No. 08/928,684, is on the lead or forward surface of the holder, i.e. the lead surface as foot 97 is moved toward holder 98, during locking. Recessed surface 450 generally extends in an oblique angle relative to the direction of rotation. That is, the surface does not extend perpendicularly to the direction of rotation, nor is it parallel therewith. Preferably the recessed surface 450 extends at an angle of about 20° to 40°, relative to the longitudinal axis of movement of the locking finger 160, or alternatively, at an angle of about 110° to 130° relative to the direction of rotation during locking or unlocking. Such a recess in surface 450 allows for surface 451 in finger 162, to readily move into a position between adjacent holders 98, as the finger 162 is moved in the locking arrangement, FIG. 11. (It is noted with respect to this, that in FIG. 11, only one holder 98 is shown, and thus an alignment of surface 451 with the next holder (to the left) is not specifically shown. However, it can be readily understood by comparison of FIGS. 10 and 11.

Attention is now directed (in FIGS. 10 and 11) to forward cam surface 453 on holder 98, and cammed surface 454 on foot 290. Some engagement between these surfaces, during locking, with one bumping and sliding along the other, to help properly orient the cover 9 and body member 8 relative to one another during locking, was generally described in U.S. Ser. No. 08/928,684. In addition, a preferred oblique angle of about 16 degrees for cammed surface 453 and about 22 degrees for cammed surface 454 were described (relative to the direction of the rotation during locking or unlocking.) Relative to the longitudinal axis of the locking finger 160, these angles are 106° and 112°, respectively. More generally, oblique angles (i.e. angles which are non-zero and not 90 degrees) with respect to the direction of rotation of the cover 9 relative to the body member 8 during locking and unlocking, on the order of 10° to 40°, and typically 20° to 25° (relative to the direction of rotation during locking or unlocking, relative to the longitudinal axis of the locking finger 160, these angles are on the order of 100°–115°) will be preferred for each of surfaces 453, 454. This is apparent from reviewing the type of interaction shown in the drawings of U.S. Ser. No. 08/928,684.

Attention is directed to recessed rear surface 460 on the holder 98 of FIGS. 10 and 11. Recessed rear surface 460 is slanted in an oblique angle of about 17° to 25°, relative to a longitudinal axis of the housing or the axis of movement of the finger 160, and the recess is in a direction of surface 450, (in extension of the surface toward finger 160), FIG. 10. Relative to the direction of rotation during locking or unlocking, the angle is about 65°–73°. This slant or recess helps prevent a mechanical jam as the finger begins to slide into a locking position, if complete rotational locking has not occurred. In general, it can help portion 461 of the finger 160 slide past the holder 98, yet retain a tight locking fit.

Other observations about the disclosure of U.S. Ser. No. 08/928,684 include the following example specifications: The filter element 55 has an outer diameter of about 60–280 mm, and an inner diameter of about 40–160 mm. The element 55 has an overall length of about 160–640 mm. The body member 8 has a length of about 130–540 mm. It has an outer diameter at portion 71 of about 100–420 mm, and an inner diameter at portion 71 of about 105–410 mm. Each of the ribs 13 on body member 8 has a width of about 3–12 mm. Each of the rings 14 is spaced about 5–20 mm from an adjacent ring. Each of the rings 14 has an outer diameter of about 100–300 mm, and a width of about 0.5–5 mm. Flange 78 extends a distance of about 3–18 mm from the sidewall section 65 of the body member 8, and about 15–60 mm from the bottom of the body member 8 and adjacent to portion 71. The deflective flange 67 has a length of about 60–250 mm, and an outer diameter of about 80–340 mm. The distance between the inner wall of body member 8 and flange 67 is about 8–35 mm. The inlet 5 has an outer diameter of about 45–200 mm. The outlet 6 has an outer diameter of about 40–180 mm, an inner diameter of about 40–180 mm, and a length of about 55–230 mm. The cover 9 has a length of about 65–250 mm. At surface 76, the cover 9 has an inner diameter of about 105–420 mm, and an outer diameter of about 110–440 mm. The exhaust tube 46 has an outer diameter of about 25–120 mm, and an inner diameter of about 25–100 mm.

In reference to FIGS. 5–7 and 13, section 128 has a length 300 of about 5–20 mm, and a width of about 0.5–4 mm. Section 129 has a length 301 to end tip 131 of about 10–40 mm and a length 302 to the edge of bump 135 of about 5–25 mm. Section 129 has a width of about 1–6 mm. Cammed surface 127 has a length between bump 135 and tip 131 of about 4–18 mm.

The tip 131 is on a radius of about 0.4–1.8 mm. Bump 135 is on a radius of about 0.5–2 mm. It has a height 304 from an edge of section 129 of about 1–7 mm. The middle of detent 114 is at a distance 305 from section 128 of about 3–14 mm. It is on a radius of about 5–20 mm. Sockets or feet 97 have a distance 307 of about 4–16 mm from bump 135 to flange 79. It has a distance 308 of about 4–16 mm between section 129 and flange 79. It has a distance 309 of about 4–16 mm between section 129 and bump 114.

In reference now to FIGS. 5–7 and 14, each projection 109 has a length 320 of about 1–7 mm and a width 321 of about 1–4 mm. Each of projections 110 has a length 320 of about 1–7 mm, and a width 322 of about 1–4 mm. The slot 112 has a length 320 of about 1–7 mm, and a width 323 of about 2–9 mm. The rear surface 120 has a length 324 of about 0.5–4 mm. The surface between rear surface 120 and curved surface 116 has a distance 325 of about 2–10 mm. The rear surface 136 has a length 329 of about 2–8 mm. The distance 330 between tip 125 and cammed surface 126 is about 1–5 mm. The surface between rear surface 136 and projection 110 has a distance 332 of about 2–9 mm. Finger 151 has a length from handle portion 155 to an end of extension 162 of about 60–260 mm. It has a width across shank portion 156 of about 10–60 mm. The tab 164 has a length of about 10–40 mm, and across its widest portion a width of about 2–10 mm. The bead 165 is on a radius of about 0.5–4, and projects about 0.5–4 mm from the tab 164. The extension 162 extends a distance of about 1–10 mm beyond the edge of the track 152, when the finger 151 is in the locked position.

III. IMPROVEMENTS IN CERTAIN EMBODIMENTS OF U.S. Ser. No. 08/928,684

Attention is now directed to FIGS. 10 and 11. From a review of FIGS. 10 and 11, it can be understood that if the foot 97 is not completely rotated against holder 98, finger 160 can not fully move into the locking position. Rather, as the finger 160 is moved toward the locking position, it can "hang up" or jam, by abutting the holder 98, with an inability to move further forward into the locking position, i.e. toward the bottom in FIG. 11 unless rotation occurs. Thus, if the operator of the arrangement is utilizing the forward motion (and stop) of the finger 160 as an indication of complete rotational locking of the rotation actuated locking system, the system could appear locked to that user, when such a "jamming" occurs. (It is noted that the oblique angled surfaces, described above, are oriented to inhibit this.)

As a way of further minimizing the risk of this perception, the finger 160 could be lengthened somewhat, and its motion adjusted, so that during locking operation of the finger, when the rotation actuated locking system is locked, a greater motion or greater amount of movement (relatively) of the handle on the finger 160 is involved. Thus, the user would sense that jamming had occurred because relatively little motion of the finger 160 will have occurred. However, for the specific arrangement depicted in FIGS. 10 and 11, the length of the movement of the finger 160 can not substantially be lengthened, due to an abutment which would occur between portion 465 of the finger 160, and portion 454 of the foot 97, FIG. 11. A modification to accommodate this, is illustrated in connection with FIGS. 29 and 30.

Figure 30:
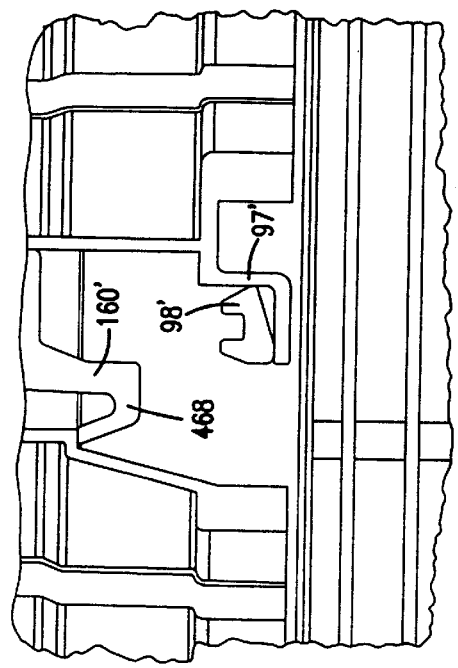
FIG. 30 depicts the arrangement of FIG. 29 in a locked orientation.
Figure 29:
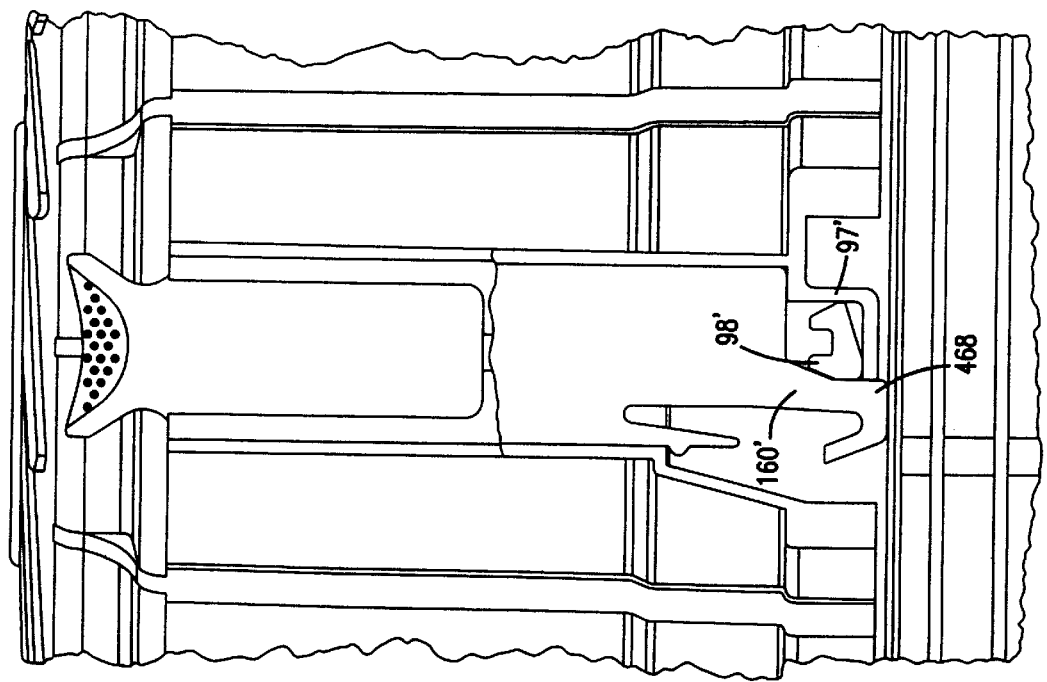
FIG. 29 is analogous to FIG. 10, depicting certain modifications and shown with an engagement finger in an unlocked orientation.

FIGS. 29 and 30 are generally analogous to FIGS. 10 and 11, except for the depiction of an elongated finger and modifications to accommodate the longer finger. Note that a portion of the foot 97' which engages the holder 98' in the vicinity of the finger 160', has been removed relative to FIGS. 10 and 11. Thus, section 468 of the finger 160', can extend well beyond the location possible for the specific arrangement of FIGS. 10 and 11. This means the sum total of longitudinal movement of the handle of the finger 160' can be over a greater longitudinal distance, and the user will be less likely to believe that the finger is locked when a mechanical jamming against the holder 98 has occurred.

It is noted that the arrangement of FIGS. 29 and 30 will be just as good at locking as the arrangement of FIGS. 10 and 11, since in a locked orientation FIG. 30, the finger 160' does prevent the cover from rotating such that foot 97' is rotationally moved away from holder 98'.

Note that the lengthening of the finger 160° FIGS. 29 and 30, could be accommodated by the arrangement of FIGS. 10 and 11 of U.S. Ser. No. 08/928,684, without modification to the arrangement other than: replacement with a longer finger 160'; and modification of the shape of one foot, i.e. the foot located where the engagement with the finger 160' occurs. The remaining feet on the cover 9 could be the same as depicted in FIGS. 5–7 of U.S. Ser. No. 08/928,684. Further, the design of the body member 8 and holders 98 thereon, did not need to be modified to accommodate this improved form of elongated locking finger 160'.

It is noted that, for the arrangement of FIGS. 29 and 30, as a result of the modification of foot 97', there is at least one foot in the overall foot-and-holder locking arrangement which lacks at least one of its two possible sites for overcenter locking. This results from the fact that foot 97' has been truncated and does not include region 290, FIG. 10, which allows for some frictional (or interference) resistance to rotation. In general, in typical arrangements this will be an insignificant loss of resistance to unlocking rotation. First, the engagement finger 160' operates to block rotation, unless and until rotation is desired. Also, frictional resistance between other foot-and-holder pairs in the overall rotational lock system can be made to provide variations in the amount of overcenter locking resistance as desired.

IV. SELECTED ADDITIONAL EMBODIMENTS

In FIGS. 17–33, improved arrangements utilizing certain of the general principles of U.S. Ser. No. 08/928,684 are presented.

Figure 17:
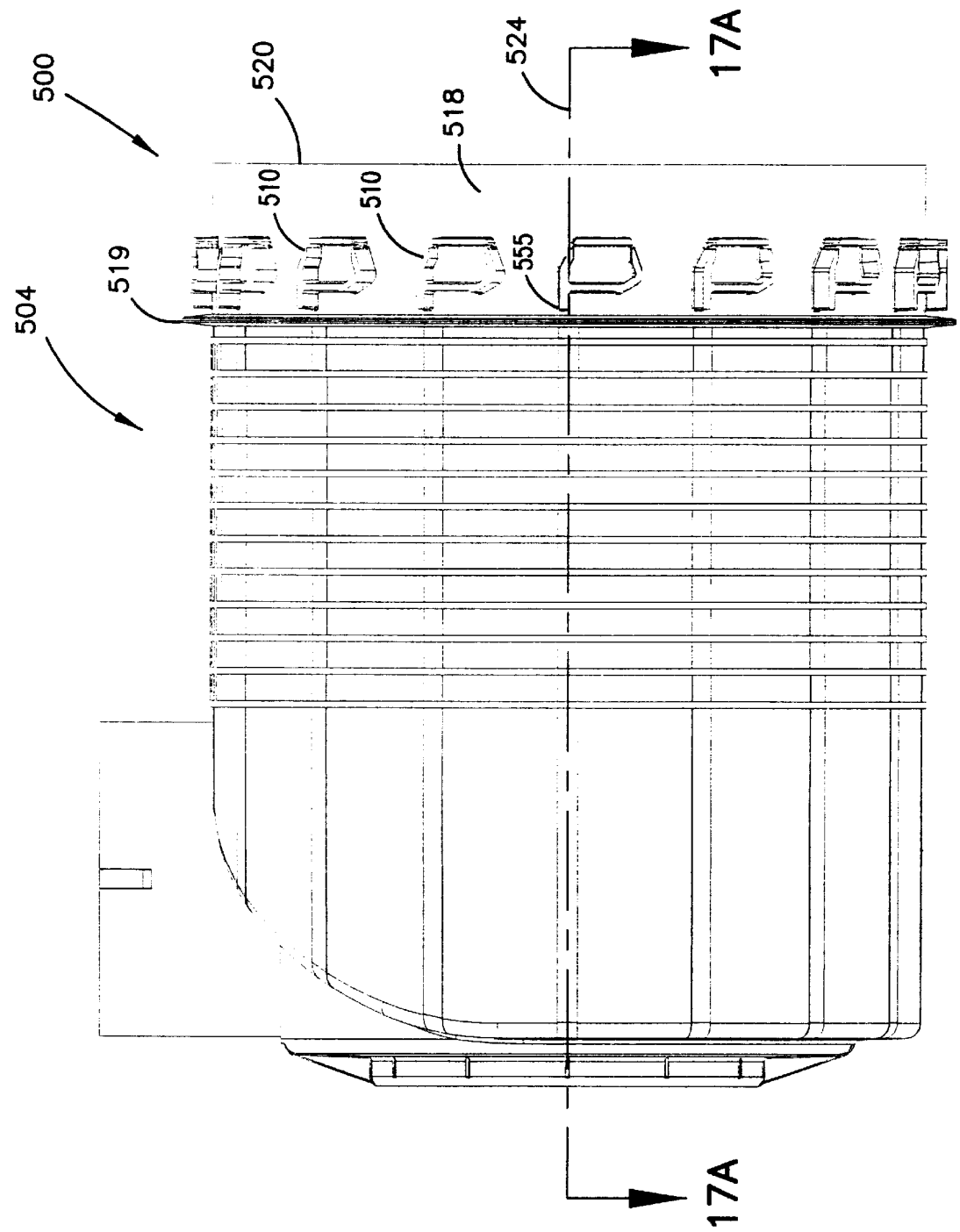
FIG. 17 is a side elevational view body member of an alternate embodiment.
Figure 18:
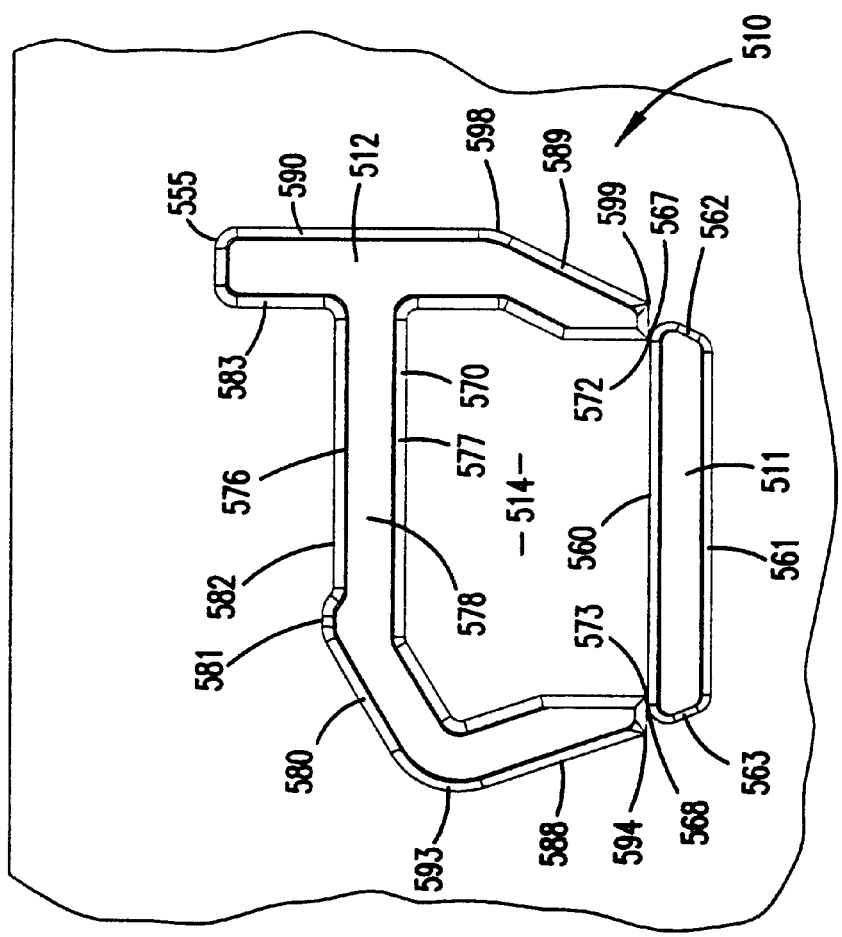
FIG. 18 is an enlarged fragmentary plan view of a holder portion of the arrangement shown in FIG. 17.
Figure 19:
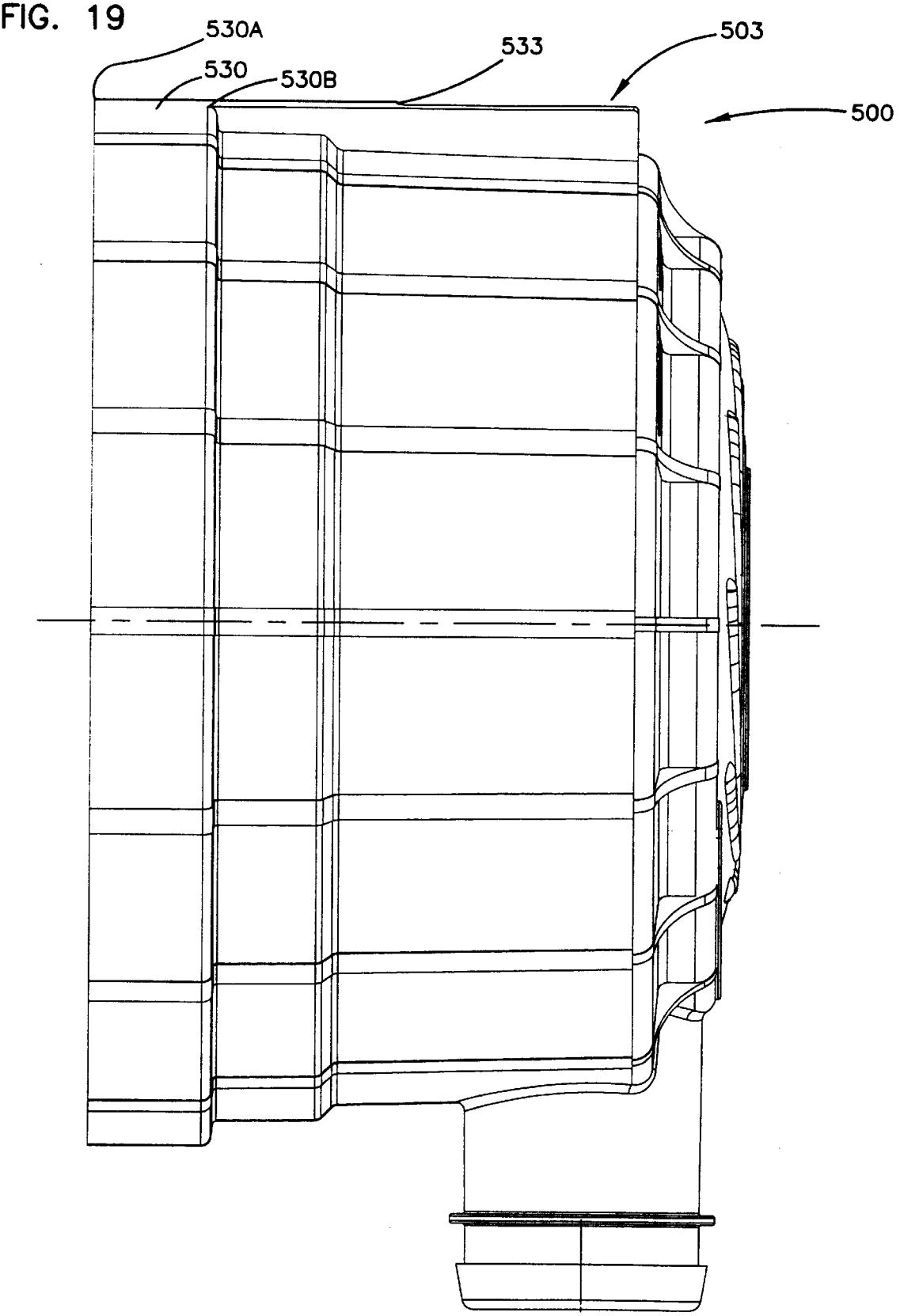
FIG. 19 is an enlarged side elevational view of a cover member sized and configured for engagement with the body member of FIG. 17.

The reference number 500, FIGS. 17 and 19, generally depicts an air cleaner assembly according to the improvements as described in this section. The air cleaner assembly 500 is not depicted in the assembled configuration, with a cover 503 mounted on the body member 504 since, if depicted in this manner, the arrangement 500 would appear very similar to the arrangement of FIG. 12 (or if no locking finger and slide mount are used, the arrangement 1 of FIG. 1). Also, no main filter element and safety element are depicted in connection with FIGS. 17–33. However, parts analogous to parts 55 and 56, FIG. 4, could be used. In FIG. 17, a side elevational view of the body member 504 is depicted. In FIG. 19, a side elevational view of cover 503 is depicted. The improvements described herein generally relate to the twist lock mechanism, and thus are not readily observable in the air cleaner 500 when assembled. Rather, the features are generally hidden from view when the air cleaner 500 is assembled, and are viewable when the parts comprising the cover 503 and the body member 504 are separated and are inspected separately.

Attention is first directed to the body member 504, FIG. 17. Comparing body member 504 to body member 8, FIGS. 1A and 4–7, several differences should be readily apparent. First, while body member 504 includes a plurality of holders 510, the holders 510 differ from holders 98, FIGS. 4–7 at least with respect to specific external configurations or shapes and overall relative size. Specifically, holders 510 are larger in area (relative to a remainder of the housing and also absolute, in preferred embodiments) than holders 98, and holders 510 are differently shaped from holders 98. By "larger in area" in this context, reference is made to the perimeter area defined by the outside perimeter of the holder when viewed in top plan view. In general, when applied to a housing of about the same overall size, and dimension, holders 510 will generally, if constructed in a preferred way as described below, each define a larger perimeter area than each one of holders 98. Preferably, the perimeter area of each of holders 510 is at least 60 mm$^2$, preferably at least 130 mm$^2$, preferably between 250–2500 mm$^2$, and typically more than 350 mm$^2$, for example about 500 mm$^2$. The reference to a "different shape" in this context, is meant to refer to the shape of the outer periphery defined by the holders 510 and 98.

Additional differences concern the following: preferred holders 510 are formed from two segments, namely segment 511 and segment 512, FIG. 18; and, the segments 511 and 512 are together oriented as perimeter segments, cooperating together to encircle or define a central "hollow" or recess 514, FIG. 18. By comparison, holders 98 are single piece and there is no perimeter completely encircling a central hollow. The area of the hollow recess 514 is at least 50 mm$^2$, preferably about 100–800 mm$^2$, and typically more than 150 mm$^2$, for example about 200 mm$^2$.

In addition, in part to accommodate the relatively large holders 510 of FIGS. 17 and 18, the relative length of portion 518 (and absolute length for preferred embodiments), generally referred to as the cover engagement surface, between radial flange 519 and end 520 is greater for the preferred embodiment of FIGS. 17–28, than for the arrangements of FIGS. 1–16.

Figure 17A:
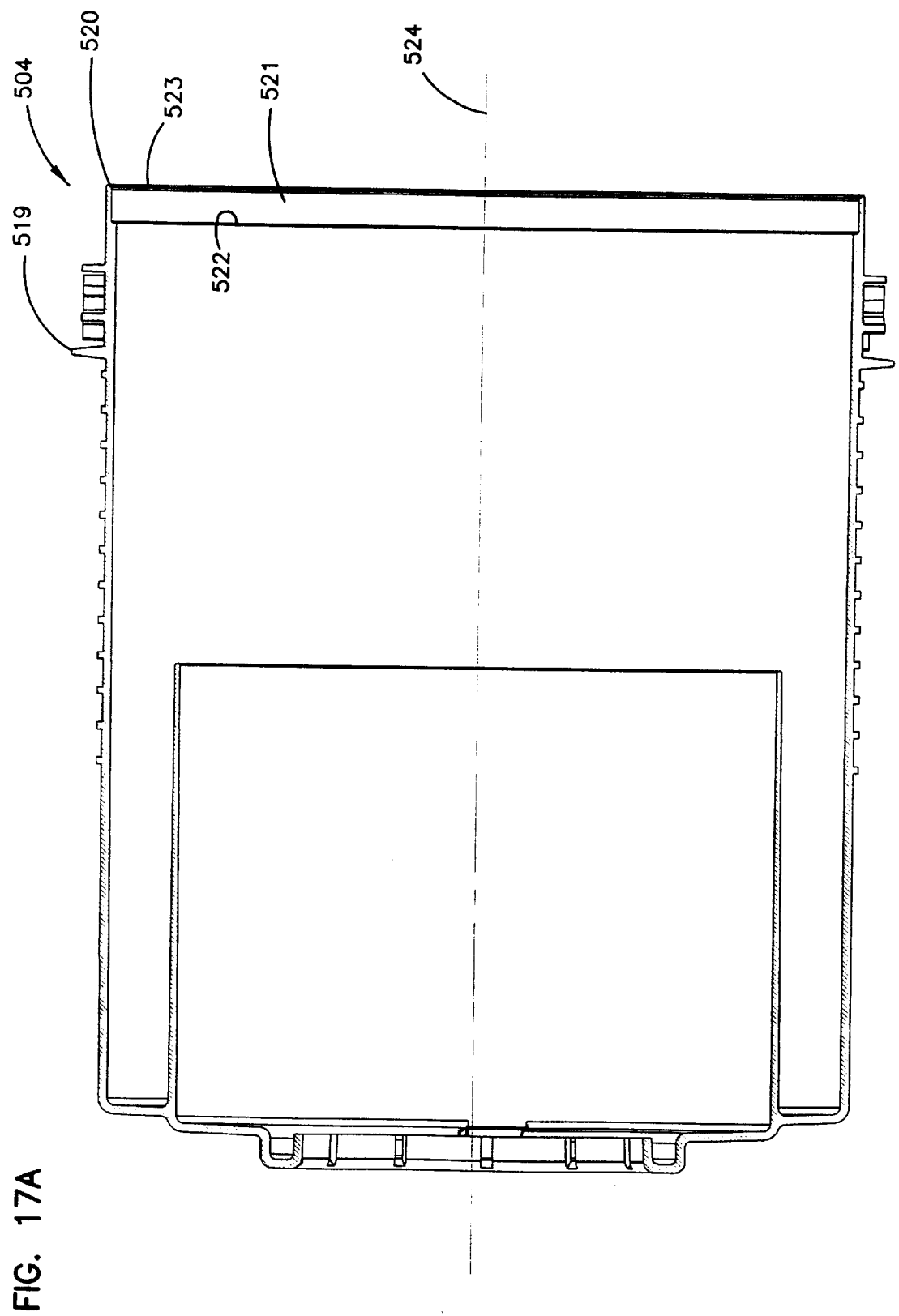
FIG. 17A is a cross-sectional view taken along line 17A—17A, FIG. 17.

In FIG. 17A, a cross-sectional view of FIG. 17 is provided. Note that end 520 includes rim section 521, shelf 522, and edge 523. For the preferred construction, FIGS. 17 and 17A, the edge 523 is circular, defining a central axis 524. For the arrangement of FIG. 17A, rim section 521 extends over a distance of at least 5 mm and typically 8 to 20 mm. Thus, it can project relatively deeply into a corresponding slot on the cover 503, FIG. 20, to provide a good weather seal between the two members 504, 503. That is, the slot 547 in FIG. 20, could be relatively deep, at least 25 mm, preferably 40 to 70 mm deep from bight section 547a to edge 543. This, in general, is a deeper slot seal than depicted for the arrangements of FIGS. 1–16. The edge 523 of the body member 504 preferably projects at least 3 mm and preferably from 6–10 mm into the slot 547, when the cover 503 is mounted on the body member 504. Preferably rim section 521 is also 1.0 to 3.0 mm thick. In preferred arrangements, each holder 510 is spaced at least 10 mm, preferably 15–30 mm, and most preferably 23 mm from the edge 523.

Specific detail concerning the construction of holders 510, and preferred structural features, are shown in FIG. 18, and are discussed herein below after a general presentation and description of the cover 503 is made.

Figure 19A:
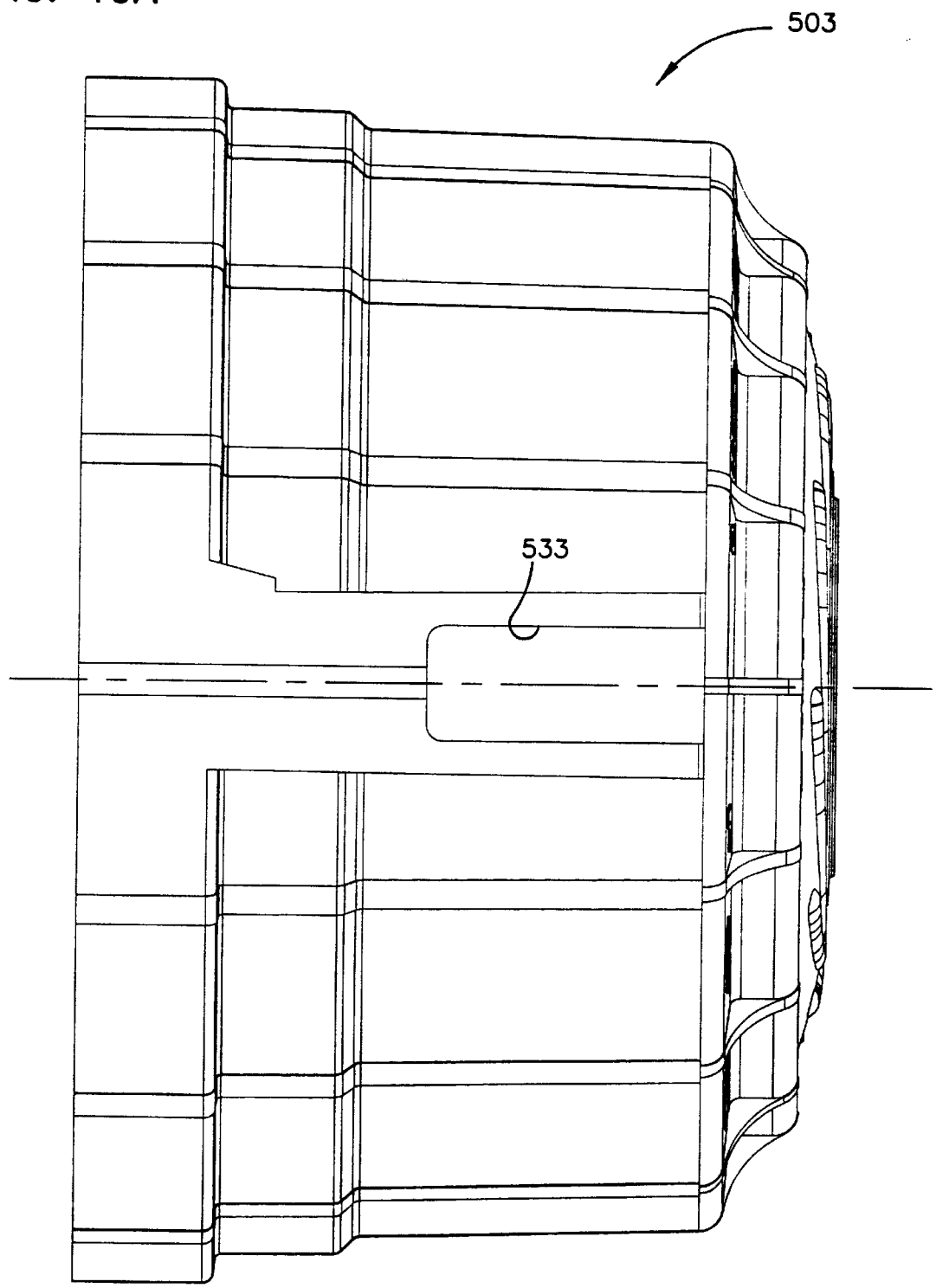
FIG. 19A is a top plan view of the cover member depicted in FIG. 19.

The cover 503 is depicted in FIGS. 19 and 19A. In FIG. 20, a cross-sectional view taken along line 20—20, FIG. 19A, is depicted.

Referring to FIG. 19, in general an exterior view of cover 503 is similar to and, in some instances, can be nearly identical to, cover 9, FIGS. 1, 2, and 4. One difference is that in region 530, cover 503 may have a longer relative extension (than the cover in FIGS. 1, 2 and 4) in order to cover the larger holders 510 preferably used on the corresponding body member 504. Typically, a length of extension of rim or cover 530, between points 530A and 530B; on the order of at least about 10 mm, and typically 15 to 30 millimeters will be preferred for arrangements according to FIGS. 17–28.

As can be seen from FIG. 19A, generally cover 503 is provided with a mounting slot or slide mount 533, for receipt therein of a locking finger, not shown in FIGS. 19 and 19A, during use. The preferred locking finger can be generally as described below in connection with FIGS. 25 and 26, with operation analogous to locking finger 160, FIGS. 10 and 11. It is noted that for the preferred embodiment depicted specific dimensions and shapes of portions of the mounting finger will be modified from the arrangement of FIGS. 10 and 11, in order to accommodate the dimensions and shape of preferred holders 510. This is demonstrated in the mounting fingers depicted in FIGS. 25 and 26, as discussed below.

Turning now to FIG. 20, cover 503 is depicted in cross-section. Differences between the cover 503, and the cover arrangement 9 of FIG. 2, can be readily observed. First, it is noted that the feet 537, FIG. 20, are configured differently from the feet 97, FIG. 2. For example, feet 537 do not have a right angle L-shape. Rather, the feet 537 each have a portion with more of an elongate, bent, banana shape. This is indicated in detail in connection with FIG. 21, discussed hereinbelow in detail.

In addition, the feet 537 each comprise two segments or portions. A front portion 540 which has the somewhat banana shape and which is the portion most directly engaged by the holders 510, as described below, during locking; and, a rear portion 541 which comprises a relatively straight segment preferably positioned immediately adjacent edge 543.

Cover 503 does include side wall segment 545 defining, in association with rim or ring 546, circular slot 547. Slot 547 is positioned as a receiving slot or sealing slot, to receipt of edge portion 523, FIG. 17A, when the cover 503 is placed on the body member 504. End 549 of rim 546 can be used to operate as a stop, upon alignment with step or shelf 522, FIG. 17A. While this operation is analogous to that for the arrangement of FIG. 2, the region of cover 9, FIG. 2, which is analogous to region 545, FIG. 20, extends over a shorter relative length, by comparison to the preferred embodiment depicted of FIG. 20.

Note that for the arrangement of FIG. 20, the cover 503 is provided with a exterior step 551, where segment 545 joins a remainder 553 of outer wall 556, with the cover member 503. This step allows for ring 546 to be readily molded integrally with the remainder of the wall segment 556, for ease of molding and strength. A similar construction was used for cover 9, FIG. 2.

In FIG. 18 one of the holders 510 is depicted in an enlarged view. The holder 510 comprises segments 511 and 512. In general, together, segments 511 and 512 define a holder 510 having, for the preferred embodiment shown, an outer circumferential shape somewhat similar to the letter "p", with a depending tail of the "p" indicated at 555 and oriented to point directly toward flange 519, FIG. 17. Herein, when the holder is characterized as having a "p-shaped" configuration, reference is meant to either the general shape of the letter p, with a perimeter oval or similar shape, and a depending tail; or, to its mirror image. That is, the mirror image of the letter "p" would still be considered "p-shaped" within the meaning of the term as used herein.

A more general characterization of the holder 510, FIG. 18, is that the preferred holders 510, as depicted, each have a region defining and circumscribing a central hollow 514; and, a projecting finger or tail 555 from that hollow. The specific preferred construction, of course, is with the "p" configuration shown, or its mirror image. It is foreseen, however, that variations from the specific perimeter configuration shown, could be utilized, as will be apparent from the further descriptions below.

Still referring to FIG. 18, segment 511 generally comprises a projection having first and second, spaced, side edges 560 and 561, joined by end edges 562 and 563. Side edges 560 and 561 are generally straight and elongate in extension, with the direction of extension generally being parallel to: end edge 523, FIG. 17; or, alternately stated, parallel to a direction of rotation of cover 503 when mounted on body member 504 and rotated between locked and unlocked orientations. As an alternate definition, the direction of extension of side edges 560 and 561 could be stated to be generally perpendicular to a central axis 524 of body member 504, FIGS. 17 and 17A.

End edges 562 and 563, on the other hand, generally each extend at an oblique angle relative to both: the body member central axis 524, FIGS. 17 and 17A; and, the direction of extension of side walls 560 and 561. Preferred angles for the extension of end walls 562 and 563 are provided herein below. Preferably, the perimeter configuration of segment of 511 is such that edge 561, which is positioned closer to end 523 than is edge 560, is at least 95% of the length of edge 560, typically at least 90% of the length of the edge 560; and, edges 560 and 561 are positioned such that edge 561 is "centered" with respect to edge 560, i.e. the approximate center of each is positioned on a line extending perpendicularly to each. This means that end edges 562 and 563, for preferred embodiments, not only extend obliquely, but generally as mirror images of one another.

In general, the preferred segment 511, FIG. 18, can be viewed as comprising a generally "D-shaped" member having a continuous sides defined by sections 560, 561, 562 and 563; and, with the continuous sides defining the perimeter wall around a central projection 565. Preferred dimensions for the height and thickness of this projection are provided hereinbelow.

Segment 512 includes two general sections. A "c-shaped" section 570; and tail 555. The "c-shaped" section defines ends 567 and 568. Generally the gap between ends 567 and 568 is positioned as such that side edge 560 of segment 511 extends between them. Preferably the wall 560 abuts or is minimally spaced from the c-shaped section 570 at points 572 and 573. As a result some flexibility in portions of the holders 510 is provided.

Segment 512 is also preferably molded as a projection, defining outer wall or edge 576 and inner wall or edge 577. Certain parts of the general exterior configuration of outer edge 576, and various surfaces and relative angles of surfaces, 10 concern the operation of the holder 510, during locking engagement. In particular, four portions of the segment 512 can, potentially, be involved in the engagement with the foot 537 during use. These are portions 580, 581, 582, and 583. Operation in these portions, during locking of the foot-and-holder lock assembly, will be apparent upon review of FIGS. 22–24.

Specifically, portion 580 can operate as a forward cam or cammed surface, which, during rotation locking, can first engage a portion of an associated foot and slide along that portion of the foot, to properly orient the foot and holder (and thus the cover and body member) relative to one another, during locking. Preferably, portion 580 extends at an oblique angle, relative to the direction of rotation, on the order of 40 to 60°, and preferably about 49°. Alternatively stated, preferably portion 580 extends at an oblique angle relative to axis 524, FIG. 17A, on the order of about 30 to 50°, typically about 41°. The extent to which portion 580 will ever engage a portion of an associated foot will, of course, depend upon how well the operator aligns the cover and body member prior to rotation. The less well the parts are aligned, the more engagement will occur, with engagement tending to align the parts.

Portion 581, on the other hand, operates as an "over-center" resistance bump, in a manner analogous to protrusion 135, FIG. 5. Resistance bump 581 will be positioned, during locking, beyond a portion of the foot which is engaged during locking, see FIGS. 22–24, and operates as an overcenter lock to resist reverse rotation until overcome by appropriate rotative force.

Figure 22:
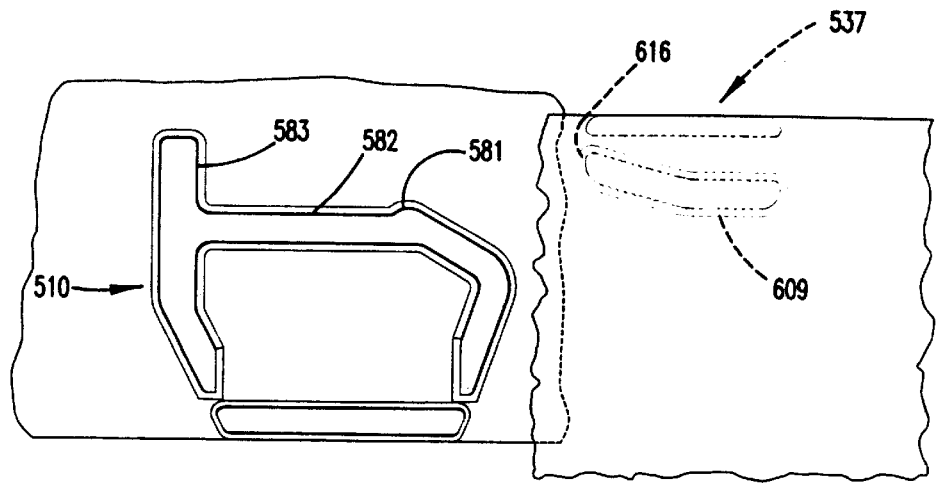
FIG. 22 is an enlarged fragmentary schematic, side elevational view of a locking arrangement for the air cleaner housing of FIGS. 17–21 depicted in an unlocked orientation and prior to engagement.
Figure 23:
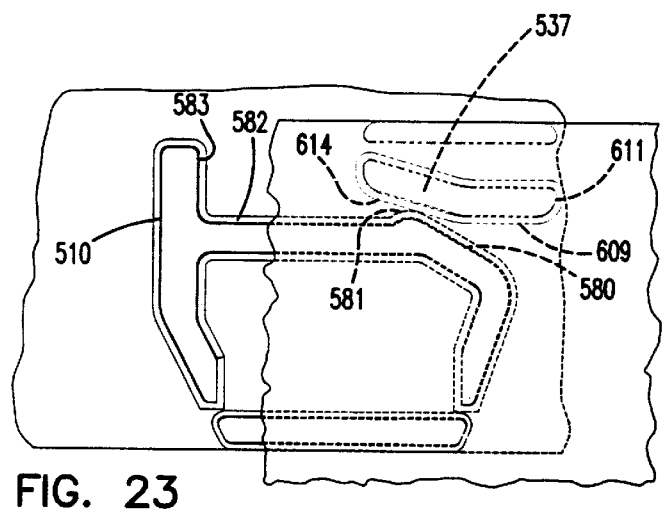
FIG. 23 is a view of the locking arrangement of FIG. 22, depicted during partial engagement between locked and unlocked orientations.
Figure 24:
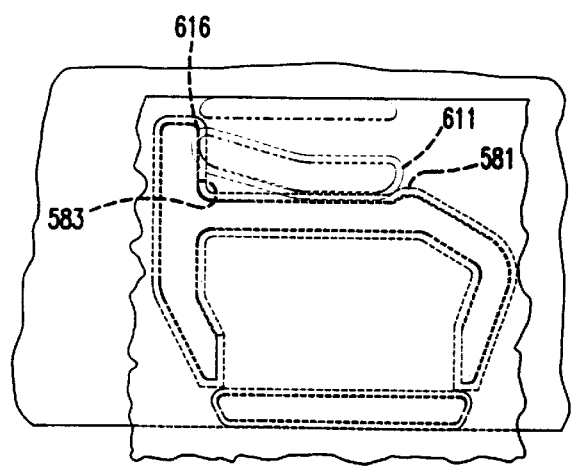
FIG. 24 is a view of the locking arrangement of FIGS. 22 and 23 depicted after full engagement.

Portion 582 generally defines a recess into which is nested a portion of a foot which is engaged during locking, see FIGS. 22–24. Preferably portion 582 extends generally parallel to flange 519 or the direction of rotation during locking; or, alternately defined, preferably portion 582 extends generally perpendicularly to central axis 524.

Finally, portion 583 operates as a rear abutment surface during locking, with locking rotation only possible until a portion of the associated foot is rotated into abutment with surface 583. As is apparent from FIGS. 22–24, relative dimension of portions 582 and 583, as well as relative dimensions of an associated portion of the foot being engaged, are chosen such that during engagement a portion of the foot nests within recess 582, locked from further rotation by surface 583 and with resistance to unlocking provided by resistance bump or bead 581. Preferred dimensions for an example are provided hereinbelow, in connection with the discussion of FIGS. 27 and 28.

Figure 25:
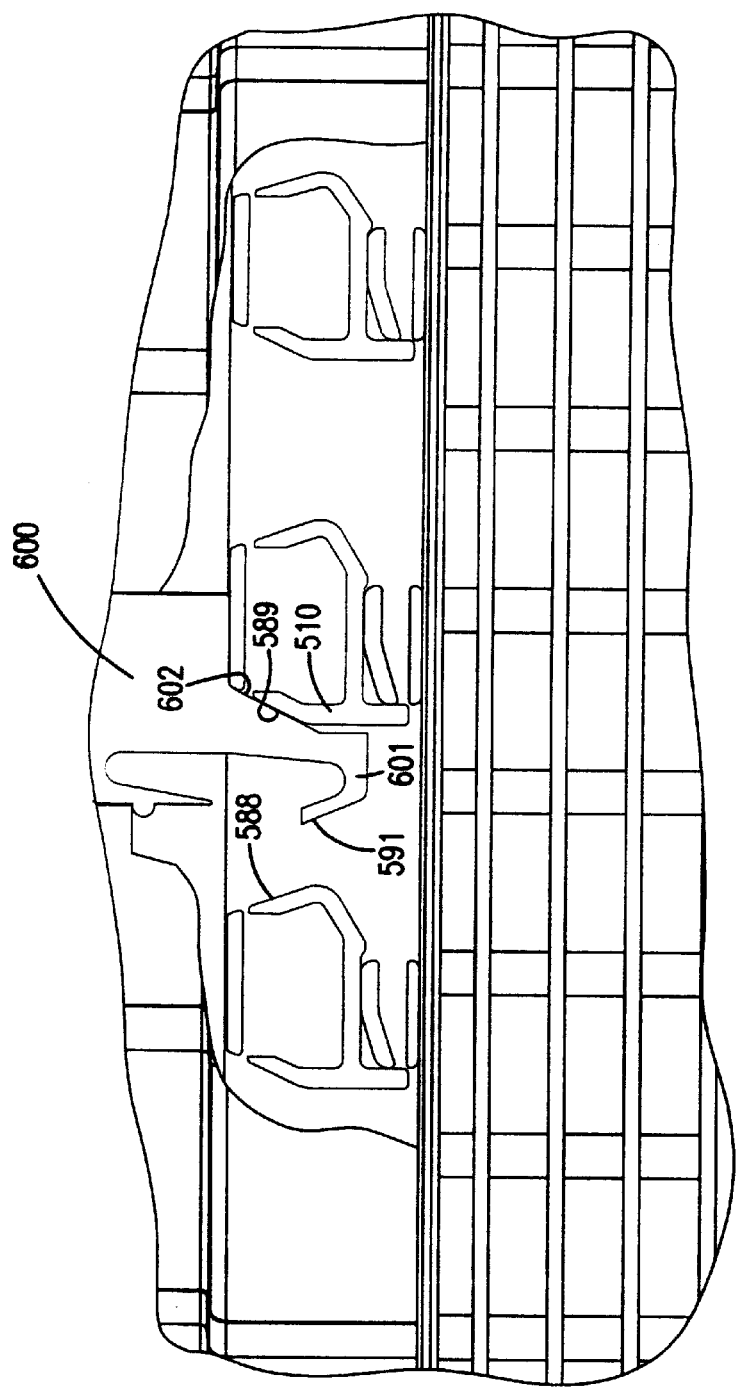
FIG. 25 is a view analogous to FIG. 24, also showing a locking finger in a locking orientation.
Figure 26:
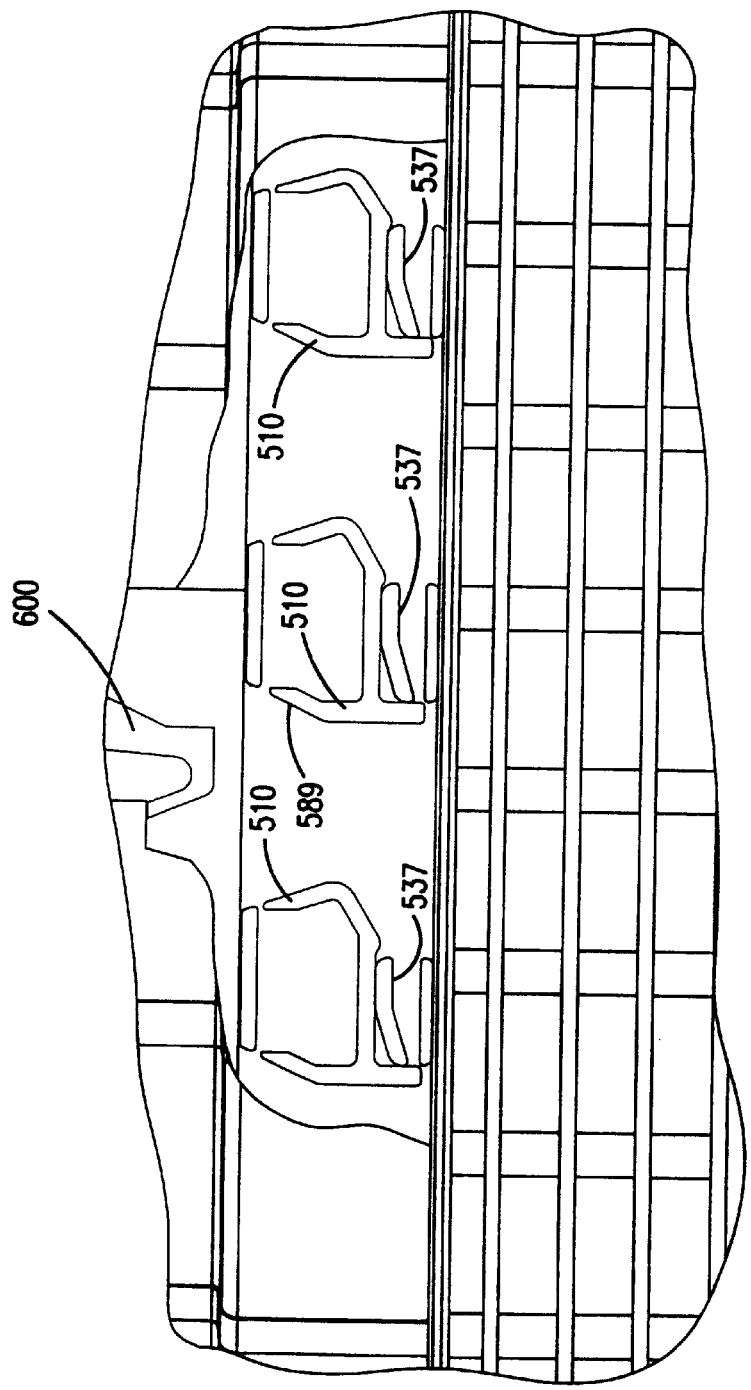
FIG. 26 is a view analogous to FIG. 25, but depicting the locking finger in an unlocked, withdrawn, orientation.
Figure 27:
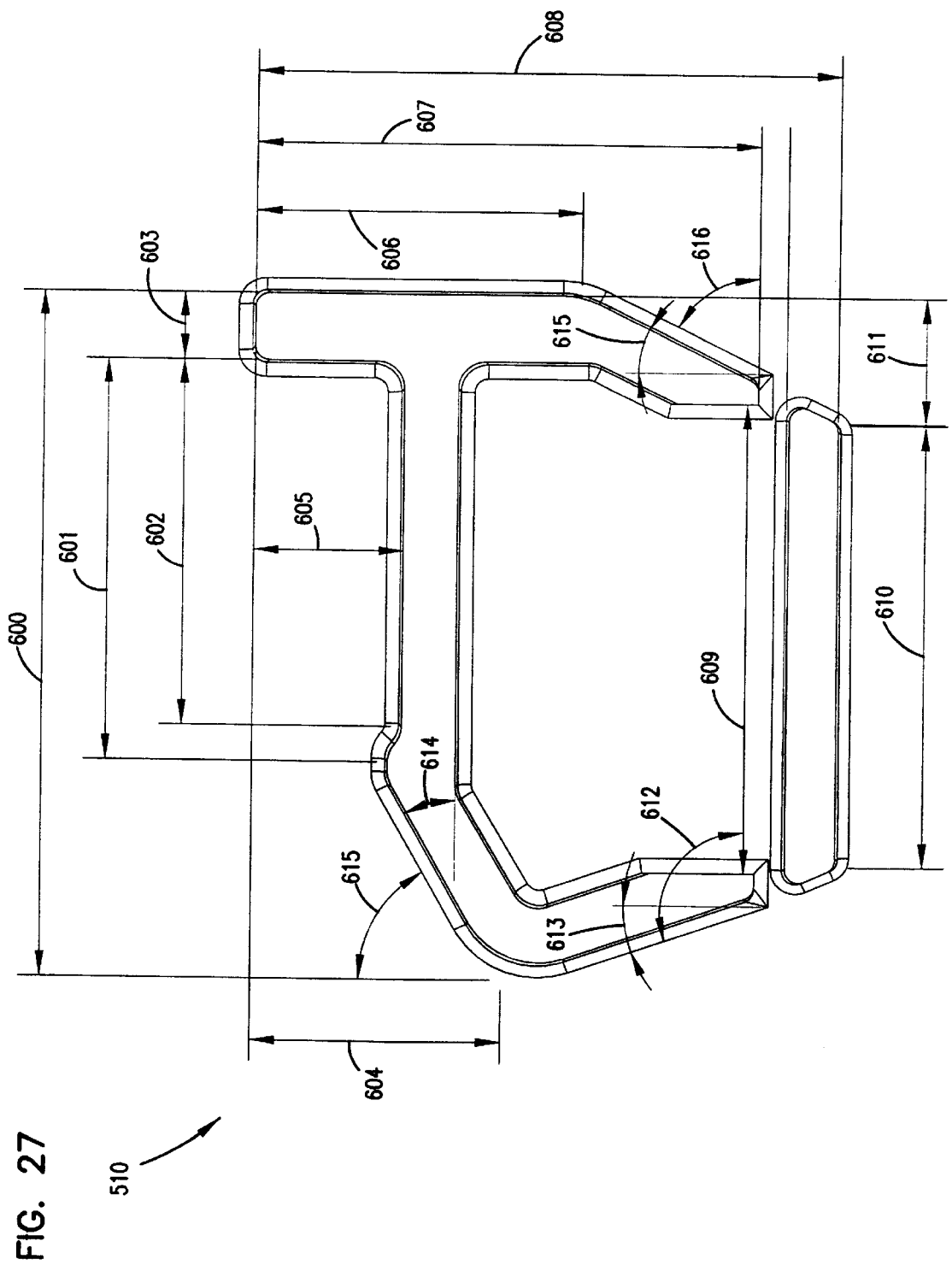
FIG. 27 is analogous to FIG. 18, with lines and angles depicted for reference to preferred dimensions.
Figure 28:
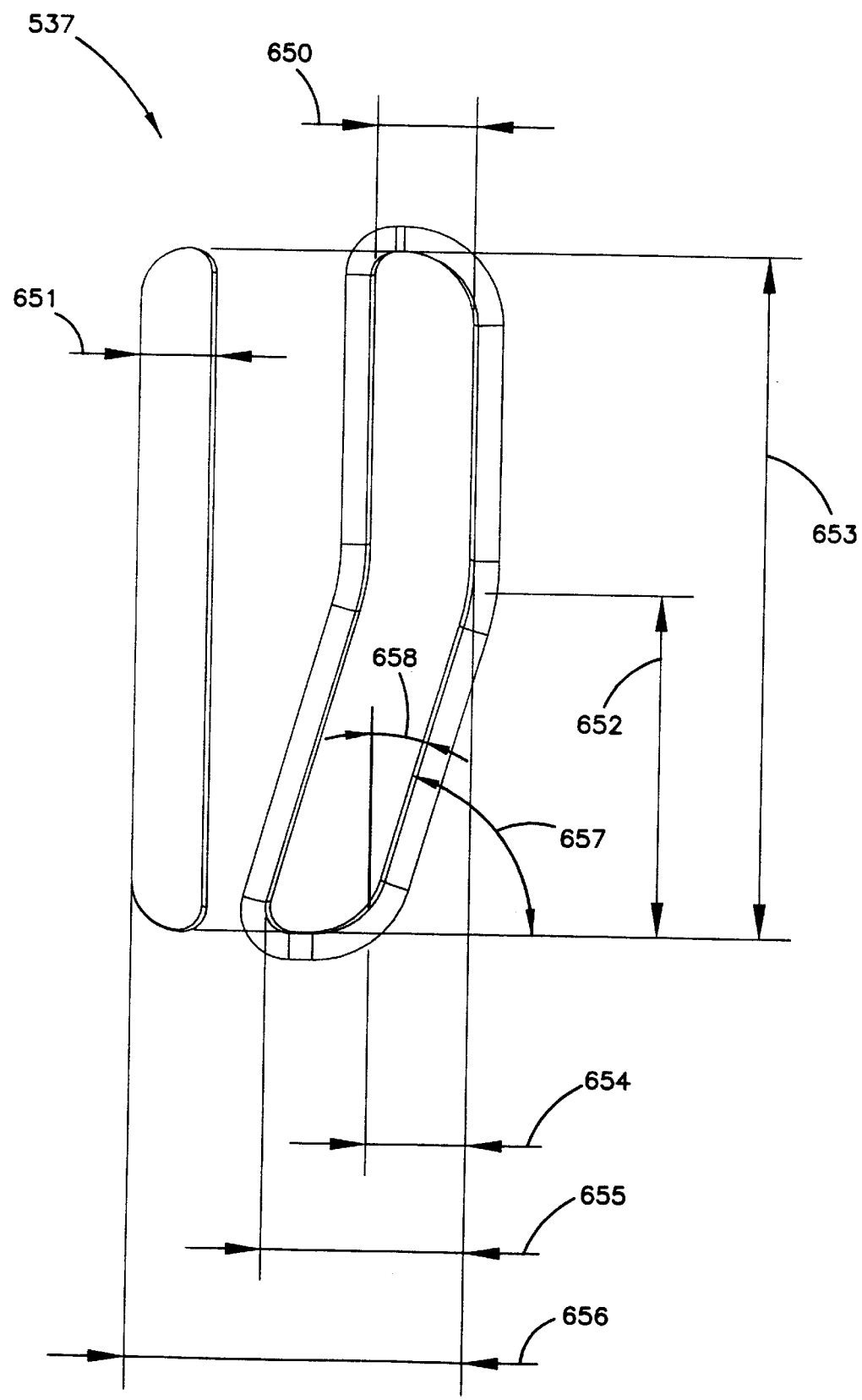
FIG. 28 is analogous to FIG. 20, with lines and angles depicted for reference to preferred dimensions.

Three portions of outer edge 576 are generally oriented to facilitate operation of an associated locking finger, see FIGS. 25 and 26. These are portions 588, 589, and 590.

Portion 588 comprises a forward recessed surface, analogous to surface 450, FIG. 10. Portion 588 generally extends at an oblique angle, typically an angle 10 to 30°, relative to central axis 524, FIG. 17A, and is recessed from the outermost or most forward point 593, to a most recessed point at 594, in extension toward segment 511. Alternately defined, surface or portion 588 extends at an oblique angle, typically about 100° to 120°, relative to flange 519 or the direction of rotation during locking.

The recess provided by the extension of portion 588 accommodates a portion of a locking finger when the holder 510 is positioned with a locking finger immediately adjacent to tip 593. The portion of the locking finger accommodated is extension 591, FIG. 25. Preferably, each holder 510 is provided with recessed portion 588 because the cover 503 is preferably constructed to be positioned at a variety of selected rotations, relative to the body member 504.

Portion 589, FIG. 18. is a rear recessed surface, generally analogous to surface 460, FIG. 10. Recessed portion 589 preferably extends at an oblique angle within the range of 10° to 30°, relative to the axis 524, FIG. 17A; or, alternately stated, at an oblique angle of about 60° to 80° relative to flange 514 or the direction of rotation during locking. The recessed extension of portion 589 is generally between points 598 and 599, with point 598 presenting the most rearward point of portion 589, i.e., with the direction of recess being toward portion 588 in a direction of extension toward segment 511, from point 598. The rear recess provided by portion 589 accommodates movement of finger 600, FIGS. 25 and 26 during locking, with inhibition of jamming. In this manner, portion 589 operates similarly to portion 460, FIGS. 10 and 11.

Finally, portion 590 extends generally toward flange 519 from point 598, with the direction of extension generally parallel to central axis 524, FIG. 17A; or, alternately defined, generally perpendicular to flange 519 or the direction of rotation during locking. Portion 590 generally provides an abutment surface for a portion of the locking finger, as indicated in detail in FIGS. 25 and 26.

In general, inner edge 577 extends between points 599 and 594, defining region 578 with respect to the outer wall 576; and, also defining internal region 514, which comprises a recessed or internal hollow between sections 511 and 512.

It is noted that the configuration for sections 511 and 512 is such that no elongate portion of either part has the thickness, between opposite sides, of greater than about 2.5 mm. This means that the wall sections can flex somewhat, in the direction of axis 524, under stresses during operation of the overcenter locking and unlocking activity. Preferably when the material chosen is polypropylene plastic (in certain cases, reinforced), thickness on the order of about 4 mm or less will be preferred, typically 2 to 3 mm. The dimension of thickness being referenced in this paragraph, again, is the thickness between the opposite sides, not the thickness of projection outwardly from the remainder of the air cleaner body, generally characterized hereinbelow.

Figure 21:
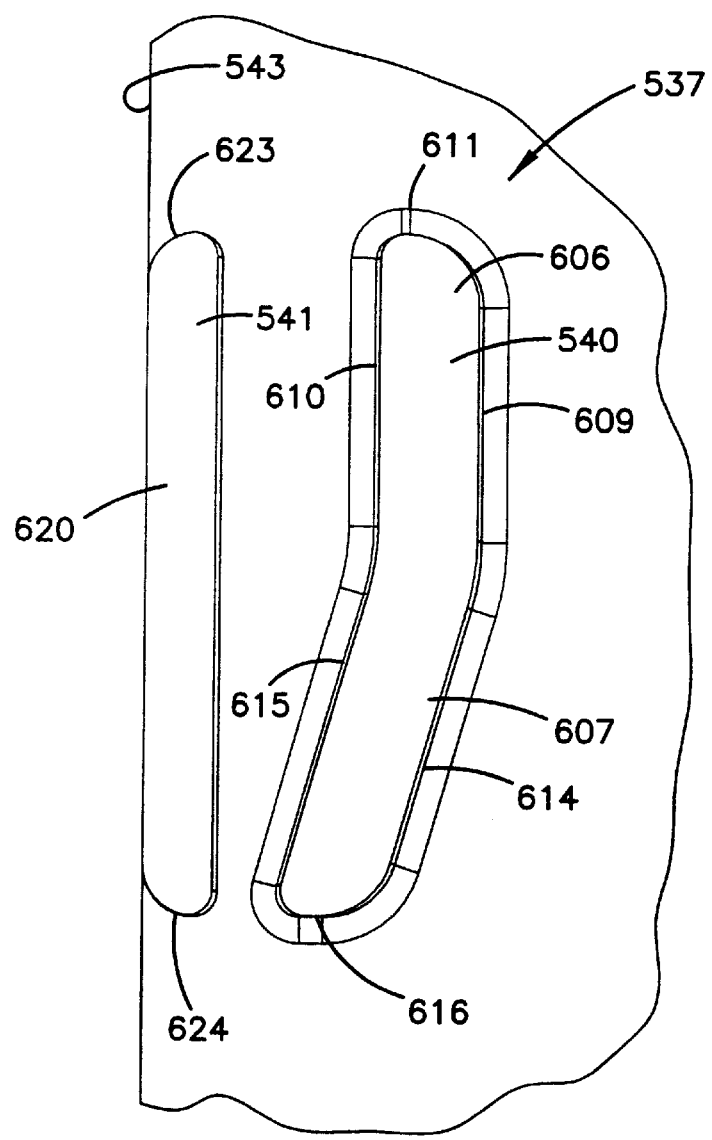
FIG. 21 is an enlarged fragmentary plan view of a foot portion of the arrangement depicted in FIG. 20.

Attention is now directed to FIG. 21, in which foot 537 is depicted. As previously indicated, foot 537 includes a front portion 540 and a rear portion 541.

Front portion 540 has a somewhat banana shape comprising segments 606 and 607. Segment 606 extends generally parallel to flange 519 and the direction of locking rotation, or, alternately stated, generally perpendicularly to central axis 524, FIG. 17A. Segment 606 is a projection defined by: opposite outer sides 609 and 610, and end or tip 611. End 611 is generally rounded and operates as an abutment surface against which the inner projection 581 is directed, during locking. In general, edge 609 comprises an outer wall against which portion 582 of an associated holder 510 is directed or nested during engagement, see FIGS. 22–24.

Segment 607 is generally directed at an oblique angle, relative to segment 606, typically centered on a line extending at an angle of about 65° to 85°, typically about 74°, relative to flange 519, and/or a direction of rotation during locking. Segment 607 is defined by edges 614 and 615, and tip 616. Tip 616 is generally rounded and is oriented to abut portion 583 of an associated holder, during locking, see FIGS. 22–24. Edge 614 is generally directed as a cammed surface or recessed surface, which can operate somewhat analogously to surface 454, FIG. 10, during locking. That is, wall 614 defines a recessed surface against which portion 580 of an associated holder 510 can be directed, during a locking rotation to properly orient the cover 509 and body member 504 for locking rotation. During locking, if the cover 505 and body member 504 are not properly aligned, the portion 580 will generally slide along wall 614, to obtain final alignment and locking, see FIGS. 22–24.

Preferably, section 540 is about 1 to 3 mm thick in dimension between walls 609 and 610, or walls 614 and 615, so that while it projects outwardly from a remainder of the cover 503, it is sufficiently thin to be somewhat flexible during the locking operation and, sufficiently strong to withstand locking forces without substantial risk of breakage, etc.

Segment 541 generally comprises an extension 620 positioned along edge 543, FIG. 20 and extending over a radial distance approximately the same as segment 540. Extension 620 is preferably about 1–2 mm thick in dimension between sides 621 and 622, with rounded tips 623 and 624. In operation, extension 620 generally protects segment 540 from damage.

Attention is now directed to FIGS. 22–24. In FIGS. 22–24, rotational operation during locking is illustrated.

In particular, FIG. 22 the holder 510 and foot assembly 537 are shown faced apart, while being rotated together into a locking arrangement. The arrangement in FIG. 22 would be an unlocked arrangement for the foot and holder mechanism.

In FIG. 23, the foot 510 and holder 537 are shown partially engaged, with engagement occurring between cam surface 614 on foot 537; and portions of bump 581 and polar cam surface 580 on holder 510.

In FIG. 24, complete locking is shown with engagement between tip 611 and bump 581, as well as between tip 616 and recess surface 583.

Attention is now directed to FIGS. 25 and 26. In FIGS. 25 and 26, operation of holders 510 and feet 537, in association with the locking finger 60, are illustrated. In particular, in FIG. 25 the arrangement shown in locking finger 600 and locked orientation, having extension finger 601 extending behind a portion of holder 510. Note that the alignment between slant and surface 602 and finger 600, and rear cam surface 589 of holder 510. The locking finger, in all features except specific shape and size of the region which engages the holder 510 during locking, may be similar to the arrangement described above in connection with 610 and 611.

In FIG. 26, the assembly is shown with the finger 600 withdrawn to an unlocked orientation, thus freeing the assembly for rotational movement of the holder 510 relative to the feet 537.

Figure 31:
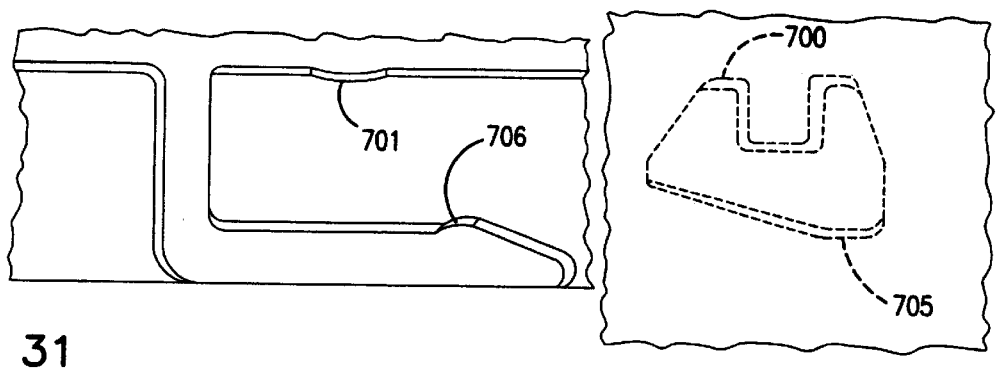
FIG. 31 is a fragmentary, schematic view analogous to FIG. 5, but depicting an alternate locking arrangement.
Figure 32:
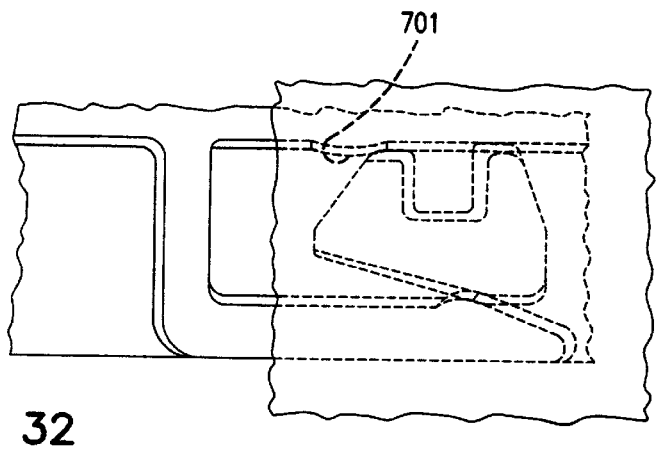
FIG. 32 is a fragmentary, schematic view of the arrangement of FIG. 31, shown moved partially to a locked position.
Figure 33:
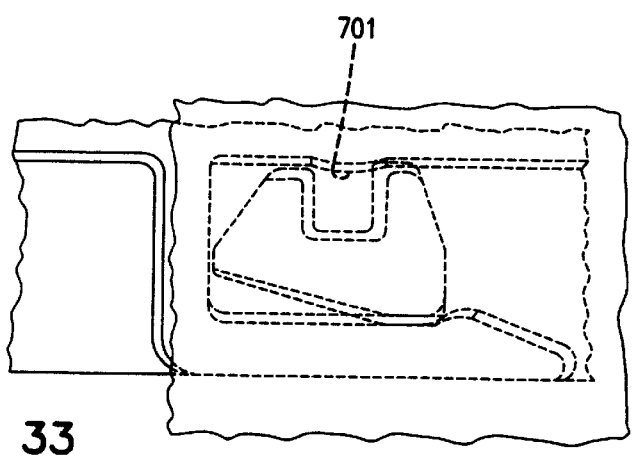
FIG. 33 is a fragmentary, schematic view of the arrangement of FIGS. 31 and 32, shown rotated to a locked position.

Attention is now directed to the alternate embodiment of FIGS. 31–33. FIGS. 31–33 depict an embodiment analogous to the arrangement shown in FIGS. 5–7 but modified in order to accommodate certain desired features. In particular to the arrangement shown in FIGS. 31–33, the region indicated at 700 is shorter than the region indicated at 109, FIGS. 5–7, preferably shortened to a distance such that it will clear, rather than fractionally contact, bump 701. As a result, the amount of frictional resistance to rotation from the arrangement in FIGS. 31–33 is reduced.

Also, the arrangement in FIGS. 31–33 is provided with a dimension of extension of region 705 shorter than region 125, FIGS. 5–7, allowing for less resistance between 705 and region 706, during over center locking. This too will result in less frictional resistance to rotational movement of the two parts.

The modifications reflected in FIGS. 31–33 may be preferred for some embodiments, in which it is desirable to provide for less rotational resistance and thus easier rotation. With such arrangements, the risk of unintended rotational movement during operation will be inhibited through the utilization of a locking arrangement using locking finger as generally described herein.

The purpose in illustrating FIGS. 31–33 is simply to indicate how with a minor modifications the arrangement shown in FIGS. 5–7, ease the rotational movement in a cover relative to the body member can be readily facilitated. The adjustments made in the arrangement of FIGS. 31–33 could be applied to all holders of a foot holder mechanism, or to selected holders, in order to achieve a desired level of frictional resistance to rotation.

V. PREFERRED DIMENSIONS FOR SELECTED ADDITIONAL EMBODIMENTS

In this section, an example is provided of a set of operating materials and specifications. These specifications are one set of examples only. A wide variety of alternate materials and sizes can be used. As to the interacting holders 510 and feet 537, the specifications provided herein will be operable across a large number of embodiments and air cleaner sizes and may only need to be adjusted for much smaller or much larger air cleaners.

The arrangement described would be particularly configured for use in a system with the following characteristics: typical air flow rate of about 100–220 CFM (about 2.8–6.2 cubic meters per minute); and typical pressure drop of about 4–8 inches of water (about 100–205 mm of water).

The body member 504 has a length of about 100–400 mm, for example, more than 200 mm, and preferably about 270–290 mm. The cover 503 has a length of about 60–200 mm for example, more than 100 mm, preferably about 130–150 mm.

There are from about 12–20, preferably about 16, holders 510. In reference now to FIG. 27, in the table below, there are reference numerals shown in the drawings. The reference numerals correspond with dimensions shown in FIG. 27 for one example holder 510. Next to the reference numerals, are typical, or preferred dimensions for the section corresponding with the dimensions shown in FIG. 27.

| Reference Number | Dimensions |
| --- | --- |
| 600 | No greater than about 60 mm; at least about 10 mm; preferably about 20–30 mm; and more preferably about 26 mm. |
| 601 | No greater than about 40 mm; at least about 5 mm; preferably about 10–20 mm; and more preferably about 15 mm. |
| 602 | No greater than about 35 mm; at least about 3 mm; preferably about 9–19 mm; and more preferably about 14 mm. |
| 603 | No greater than about 10 mm; at least about 0.5 mm; preferably about 2–3 mm; and more preferably about 2.5 mm. |
| 604 | No greater than about 20 mm; at least about 3 mm; preferably about 6–15 mm; and more preferably about 9 mm. |
| 605 | No greater than about 12 mm; at least about 1 mm; preferably about 3–9 mm; and more preferably about 6 mm. |
| 606 | No greater than about 25 mm; at least about 4 mm; preferably about 8–16 mm; and more preferably about 12 mm. |
| 607 | No greater than about 38 mm; at least about 8 mm; preferably about 13–25 mm; and more preferably about 19 mm. |
| 608 | No greater than about 42 mm; at least about 9 mm; preferabty about 18–24 mm; and more preferably about 21 mm. |
| 609 | No greater than about 36 mm; at least about 8 mm; preferably about 12–25 mm; and more preferably about 18 mm. |
| 610 | No greater than about 35 mm; at least about 7 mm; preferably about 10–23 mm; and more preferably about 17 mm. |
| 611 | No greater than about 10 mm; at least about 1 mm; preferably about 3–7 mm; and more preferably about 5 mm. |
| 612 | No greater than about 150 °; at least about 80 °; preferably about 100–120 °; and more preferably about 110 °. |
| 613 | No greater than about 50 °; at least about 5 °; preferably about 10–30 °; and more preferably about 20 °. |
| 614 | No greater than about 90 °; at least about 25 °; preferably about 40–60 °; and more preferably about 49 °. |

-continued

| Reference Number | Dimensions |
| --- | --- |
| 615 | No greater than about 80 °; at least about 20 °; preferably about 30–50 °; and more preferably about 41 °. |
| 616 | No greater than about 140 °; at least about 35 °; preferably about 60–80 °; and more preferably about 70 °. |
| 617 | No greater than about 40 °; at least about 5 °; preferably about 10–30 °; and more preferably about 20 °. |

Each of the holders 510 projects at least about 2 mm, preferably about 3–8 mm, and more preferably about 6 mm from the exterior surface of the cover 504. The holders 510 with a draft angle of not more than 1° on each side, to assist with de-molding.

In the table below, there are reference numerals shown in the drawings. The reference numerals correspond with dimensions shown in FIG. 28 for one example foot 537. Next to the reference numerals, are typical, or preferred dimensions for the section corresponding with the dimensions shown in FIG. 28.

| Reference Number | Dimensions |
| --- | --- |
| 650 | No greater than about 5 mm; at least about 0.5 mm; preferably about 1–3 mm; and more preferably about 2 mm. |
| 651 | No greater than about 5 mm; at least about 0.25 mm; preferably about 1–3 mm; and more preferably about 1.5 mm. |
| 652 | No greater than about 15 mm; at least about 2 mm; preferably about 4–19 mm; and more preferably about 7 mm. |
| 653 | No greater than about 25 mm; at least about 6 mm; preferably about 8–20 mm; and more preferably about 14 mm. |
| 654 | No greater than about 6 mm; at least about 0.5 mm; preferably about 1–4 mm; and more preferably about 2 mm. |
| 655 | No greater than about 10 mm; at least about 1 mm; preferably about 2–7 mm; and more preferably about 4 mm. |
| 656 | No greater than about 15 mm; at least about 2 mm; preferably about 4–10 mm; and more preferably about 7 mm. |
| 657 | No greater than about 140 °; at least about 35 °; preferably about 65–85 °; and more preferably about 74 °. |
| 658 | No greater than about 40 °; at least about 3 °; preferably about 5–25 °; and more preferably about 16 °. |

Each of the feet 537 projects at least about 2 mm, preferably about 3–8 mm, and more preferable about 6 mm from the exterior surface of the body member 503. The feet 537. are molded with a draft angle of not more than 1° on each side, to assist with de-molding.

The housing of FIGS. 17 and 19 can be mounted using a mounting band similar to that disclosed above and described in connection with FIGS. 15 and 16, or with variation thereof.

What is claimed is:

1. A method of locking an air cleaner cover onto an air cleaner body member; said method including a step of:
   (a) rotating the cover relative to the air cleaner body member to provide locking engagement between a holder arrangement and a foot arrangement; the holder arrangement comprising a plurality of p-shaped holders; selected ones of the p-shaped holders having tails; the foot arrangement comprising a plurality of feet;
  (i) said step of rotating comprising rotating sufficiently to orient selected ones of the plurality of p-shaped holders into engagement with selected ones of the plurality of feet; and
  (ii) said step of rotating including rotating the cover to orient tails of selected ones of each p-shaped holder into engagement with selected ones of the plurality of feet to block rotation of the cover relative to said body member beyond a selected amount of rotation.

2. A method according to claim 1 wherein:
(a) said step of rotating includes rotating the cover relative to the body in a direction generally perpendicular to a direction of extension of each of the tails.

3. A method according to claim 1 wherein:
(a) each of the feet includes a banana shaped segment; and
(b) said step of rotating includes rotating the cover to orient tails of selected ones of each p-shaped holder into engagement with selected ones of the banana shaped segments of each of the plurality of feet.

4. A method according to claim 1 wherein:
(a) said step of rotating includes rotating the cover relative to the body member, wherein there is an equal number of p-shaped holders as feet.

5. A method according to claim 1 wherein:
(a) each of the p-shaped holders has at least a first segment and a second segment; each of the second segments including a C-shaped section and a depending tail; and
(b) said step of rotating includes rotating the cover relative to the body in a direction generally parallel to a direction of extension of each of the first segments.

6. A method according to claim 1 further including:
(a) after said step of rotating, depressing an engagement finger into an engagement position, to block unintended reverse rotation of the cover, relative to the body member.

7. A method of securing a cover member to a body member, in an air cleaner assembly; the method including:
(a) covering an open end of the body member with the cover;
(b) rotating the cover, relative to the body member, to provide locking engagement between a holder arrangement and a foot arrangement; and
(c) depressing an engagement finger into an engagement position, to block unintended reverse rotation of the cover, relative to the body member.

8. A method according to claim 7 wherein:
(a) said step of rotating includes rotating the cover relative to the body member to provide locking engagement between selected ones of a plurality of p-shaped holders and selected ones of a plurality of feet.

9. A method according to claim 7 wherein:
(a) said step of depressing includes depressing an engagement finger into an engagement position to secure a portion of a selected holder of the holder arrangement between a portion of the engagement finger and a portion of a selected foot member of the foot arrangement to prevent rotational movement of the cover relative to the body member.

10. A method according to claim 9 wherein:
(a) said step of depressing includes sliding the engagement finger along a slide mount on the cover.

11. A method according to claim 10 wherein:
(a) said step of rotating includes rotating the cover relative to the body member to provide locking engagement between selected ones of p-shaped holders and selected ones of banana-shaped feet.

12. A method of locking an air cleaner cover onto an air cleaner body member; said method including a step of:
(a) rotating the cover relative to the air cleaner body member to provide locking engagement between a holder arrangement and a foot arrangement; the holder arrangement comprising a plurality of p-shaped holders; the foot arrangement comprising a plurality of feet;
  (i) said step of rotating comprising rotating sufficiently to orient selected ones of the plurality of p-shaped holders into engagement with selected ones of the plurality of feet; and
  (ii) said step of rotating including rotating the cover relative to the body member, wherein there is an equal number of p-shaped holders as feet.

13. A method according to claim 12 wherein:
(a) selected ones of each of the feet includes a banana shaped segment; and
(b) said step of rotating includes rotating the cover to orient selected ones of each p-shaped holder into engagement with selected ones of the banana shaped segments of each of the plurality of feet.

14. A method according to claim 13 wherein:
(a) each of the p-shaped holders has at least a first segment and a second segment;
each of-the second segments including a C-shaped section and a depending tail; and
(b) said step of rotating includes rotating the cover relative to the body in a direction generally parallel to a direction of extension of each of the first segments.

15. A method according to claim 12 further including:
(a) after said step of rotating, depressing an engagement finger into an engagement position, to block unintended reverse rotation of the cover, relative to the body member.

16. A method of securing a cover to a body member, in an air cleaner assembly; the method including:
(a) covering an open end of the body member with the cover; and
(b) orienting an edge on an internal step of the body member into an internal slot in the cover while rotating the cover, relative to the body member, to engage a rotation activated lock assembly;
  (i) at least a portion of the rotation activated lock assembly being oriented on the body member and spaced at least 10 mm from the edge of the body member.

17. A method according to claim 16 wherein:
(a) said step of orienting includes rotating the cover, relative to the body member, to provide locking engagement between a rotation activated lock assembly including a holder arrangement and a foot arrangement.

18. A method according to claim 17 wherein:
(a) said step of orienting includes rotating the cover relative to the body member to provide locking engagement between selected ones of a plurality of p-shaped holders and selected ones of a plurality of feet;
  (i) the p-shaped holders being oriented on the body member and spaced 15–30 mm from the edge of the body member.

19. A method according to claim 16 further including:
(a) after said step of orienting, depressing an engagement finger into an engagement position, to block unintended reverse rotation of the cover, relative to the body member.

20. A method of locking an air cleaner cover onto an air cleaner body member; said method including a step of:
(a) rotating the cover relative to the air cleaner body member to provide locking engagement between a holder arrangement and a foot arrangement; the holder arrangement comprising a plurality of p-shaped holders; selected ones of the p-shaped holders having tails; the foot arrangement comprising a plurality of feet;
  (i) said step of rotating comprising rotating sufficiently to orient selected ones of the plurality of p-shaped holders toward selected ones of the plurality of feet; and
  (ii) said step of rotating including rotating the cover to orient tails of selected ones of each p-shaped holder toward selected ones of the plurality of feet to block rotation of the cover relative to said body member beyond a selected amount of rotation.

21. A method according to claim 20 further including:
(a) after said step of rotating, depressing an engagement finger into an engagement position, to block unintended reverse rotation of the cover, relative to the body member.

* * * * *